US012796623B2

(12) United States Patent
Haneda et al.

(10) Patent No.: US 12,796,623 B2
(45) Date of Patent: Nov. 17, 2026

(54) WORKING MACHINE SYSTEM AND WORKING MACHINE

(71) Applicant: MAKITA CORPORATION, Anjo (JP)

(72) Inventors: Koji Haneda, Anjo (JP); Kazuya Kato, Anjo (JP); Tomoya Kunishima, Anjo (JP)

(73) Assignee: MAKITA CORPORATION, Anjo (JP)

(*) Notice: Subject to any disclaimer, the term of this patent is extended or adjusted under 35 U.S.C. 154(b) by 182 days.

(21) Appl. No.: 18/829,539

(22) Filed: Sep. 10, 2024

(65) Prior Publication Data

US 2025/0081895 A1 Mar. 13, 2025

(30) Foreign Application Priority Data

Sep. 12, 2023 (JP) ................................ 2023-147868

(51) Int. Cl.
*A01G 3/037* (2006.01)
*A45F 5/14* (2006.01)
*A45F 5/00* (2006.01)

(52) U.S. Cl.
CPC ................ *A01G 3/037* (2013.01); *A45F 5/14* (2013.01); *A45F 5/1575* (2025.01)

(58) Field of Classification Search
CPC ...... A01G 3/037; A01G 3/053; A01G 3/0475; A01G 3/033; A01G 3/021; A01G 3/047; A45F 5/14; A45F 5/1575; B26B 15/00; H02J 7/00; G05B 19/00
USPC ............................... 30/228, 247, 248; 173/1
See application file for complete search history.

(56) References Cited

U.S. PATENT DOCUMENTS

| | | | | | |
|---|---|---|---|---|---|
| 11,241,764 | B2 * | 2/2022 | Isobe | B23Q 3/15534 | |
| 2011/0289783 | A1 * | 12/2011 | Polyakova | B26B 29/02 | 30/151 |
| 2023/0172113 | A1 * | 6/2023 | Steinhauer | A01G 3/037 | 30/228 |

FOREIGN PATENT DOCUMENTS

| | | | | |
|---|---|---|---|---|
| CA | 2879348 | A1 * | 1/2014 | B23B 45/02 |
| JP | 2008-067630 | A | 3/2008 | |
| KR | 20220168711 | A * | 12/2022 | A01G 23/095 |
| WO | WO-2005084416 | A1 * | 9/2005 | A01G 3/037 |

* cited by examiner

*Primary Examiner* — Ghassem Alie
(74) *Attorney, Agent, or Firm* — Sughrue Mion, PLLC

(57) ABSTRACT

A working machine system may include a working machine, a working machine holder, and a detection mechanism configured to detect whether the working machine is held by the working machine holder. The working machine may be configured to be switched between a first state and a second state in which a predetermined switching manipulation is required to switch to the first state. When the detection mechanism detects that the working machine is not held, the working machine may switch from the first state to the second state in response to the working machine being unattended for a first predetermined time period. When the detection mechanism detects that the working machine is held, the working machine may switch from the first state to the second state in response to the working machine being unattended for a second predetermined time period which is longer than the first predetermined time period.

11 Claims, 11 Drawing Sheets

WORKING MACHINE SYSTEM AND WORKING MACHINE

REFERENCE TO RELATED APPLICATION

This application claims priority to Japanese Patent Application No. 2023-147868 filed on Sep. 12, 2023. The entire content of the priority application is incorporated herein by reference.

TECHNICAL FIELD

Teachings disclosed herein relate to working machine systems and a working machine.

BACKGROUND ART

Japanese Patent Application Publication No. 2008-067630 describes a working machine system including a working machine having a working unit configured to perform a working operation, an electric motor configured to drive the working unit, a manipulation unit configured to be manipulated by a user, a power connection unit configured to be connected to a power source, and a control unit; and a working machine holder having a case portion configured to house at least the working unit and an attachment portion configured to be detachably attached to the user. The working machine is switched between a first state in which the working operation is permitted and a second state in which the working operation is prohibited and a predetermined switching manipulation to the manipulation unit is required to switch to the first state.

SUMMARY

The working machine of Japanese Patent Application Publication No. 2008-067630 may be automatically switched from the first state to the second state when the working machine is left unattended for a certain time period. However, when the working machine is left unattended in the working machine holder, it is expected that the user will use the working machine again soon after. Therefore, the working machine's automatic switching to the second state (regardless of the user's intention) while the working machine is held by the working machine holder could hinder the work the user is performing. For example, to use the working machine in the first state, the user has to perform the switching manipulation to switch the working machine from the second state to the first state, which may bother the user. Thus, this working machine is inferior in usability. The disclosure herein provides teachings for improving usability of a working machine.

A working machine system disclosed herein may comprise a working machine, a working machine holder, and a detection mechanism. The working machine may include a working unit configured to perform a working operation, an electric motor configured to drive the working unit, a manipulation unit configured to be manipulated by a user, a power connection unit configured to be connected to a power source, and a control unit. The working machine holder may include a case portion configured to house at least the working unit and an attachment portion configured to be detachably attached to the user. The detection mechanism may be configured to detect whether the working machine is held by the working machine holder. The working machine may be configured to be switched between a first state in which the working operation is permitted and a second state in which the working operation is prohibited and a predetermined switching manipulation to the manipulation unit is required to switch to the first state. The control unit may be configured to execute a second state switching process in which the control unit switches the working machine from the first state to the second state, in response to a predetermined condition being satisfied. When the detection mechanism detects that the working machine is not held by the working machine holder, the predetermined condition may include that an unattended time period of the working machine is more than or equal to a first predetermined time period. When the detection mechanism detects that the working machine is held by the working machine holder, the predetermined condition may include that the unattended time period of the working machine is more than or equal to a second predetermined time period which is longer than the first predetermined time period.

According to the configuration above, when the working machine is left unattended in the first state, the working machine is automatically switched from the first state to the second state by the second state switching process executed by the control unit. However, while the working machine is held by the working machine holder, the condition that triggers the second state switching process is less likely to be satisfied, as compared to while the working machine is not held by the working machine holder. Thus, while the working machine is held by the working machine holder, the working machine is suppressed from automatically switching from the first state to the second state. This can reduce bothersome the user would feel and thus improves the usability of the working machine.

Another working machine system disclosed herein may comprise a working machine, a working machine holder, and a detection mechanism. The working machine may include a working unit configured to perform a working operation, an electric motor configured to drive the working unit, a manipulation unit configured to be manipulated by a user, a power connection unit configured to be connected to a power source, and a control unit. The working machine holder may include a case portion configured to house at least the working unit and an attachment portion configured to be detachably attached to the user. The detection mechanism may be configured to detect whether the working machine is held by the working machine holder. The working machine may be configured to be switched between a first state in which the working operation is permitted and a second state in which the working operation is prohibited and a predetermined switching manipulation to the manipulation unit is required to switch to the first state. The control unit may be configured to execute a second state switching process in which the control unit switches the working machine from the first state to the second state. When the detection mechanism detects that the working machine is not held by the working machine holder, the control unit may execute the second state switching process in response to a predetermined condition being satisfied. When the detection mechanism detects that the working machine is held by the working machine holder, the control unit may not execute the second state switching process in response to the predetermined condition being satisfied.

According to the configuration above, when the working machine is left unattended in the first state, the working machine is automatically switched from the first state to the second state by the second state switching process executed by the control unit. However, while the working machine is held by the working machine holder, the second state switching process is less likely to be executed, as compared to while the working machine is not held by the working machine holder. Thus, while the working machine is held by the working machine holder, the working machine is suppressed from automatically switching from the first state to the second state. This can reduce bothersome the user would feel and thus improves the usability of the working machine.

A working machine disclosed herein may be configured to be held by a working machine holder. The working machine may include a working unit configured to perform a working operation, an electric motor configured to drive the working unit, a manipulation unit configured to be manipulated by a user, a power connection unit configured to be connected to a power source, a detector configured to detect whether the working machine is held by the working machine holder, and a control unit. The working machine may be configured to be switched between a first state in which the working operation is permitted and a second state in which the working operation is prohibited and a predetermined switching manipulation to the manipulation unit is required to switch to the first state. The control unit may be configured to execute a second state switching process in which the control unit switches the working machine from the first state to the second state, in response to a predetermined condition being satisfied. When the detector detects that the working machine is not held by the working machine holder, the predetermined condition may include that an unattended time period of the working machine is more than or equal to a first predetermined time period. When the detector detects that the working machine is held by the working machine holder, the predetermined condition may include that the unattended time period of the working machine is more than or equal to a second predetermined time period which is longer than the first predetermined time period.

According to the configuration above, when the working machine is left unattended in the first state, the working machine is automatically switched from the first state to the second state by the second state switching process executed by the control unit. However, while the working machine is held by the working machine holder, the condition that triggers the second state switching process is less likely to be satisfied, as compared to while the working machine is not held by the working machine holder. Thus, while the working machine is held by the working machine holder, the working machine is suppressed from automatically switching from the first state to the second state. This can reduce bothersome the user would feel and thus improves the usability of the working machine.

Another working machine disclosed herein may be configured to be held by a working machine holder. The working machine may include a working unit configured to perform a working operation, an electric motor configured to drive the working unit, a manipulation unit configured to be manipulated by a user, a power connection unit configured to be connected to a power source, a detector configured to detect whether the working machine is held by the working machine holder, and a control unit. The working machine may be configured to be switched between a first state in which the working operation is permitted and a second state in which the working operation is prohibited and a predetermined switching manipulation to the manipulation unit is required to switch to the first state. The control unit may be configured to execute a second state switching process in which the control unit switches the working machine from the first state to the second state. When the detector detects that the working machine is not held by the working machine holder, the control unit may execute the second state switching process in response to a predetermined condition being satisfied. When the detector detects that the working machine is held by the working machine holder, the control unit may not execute the second state switching process in response to the predetermined condition being satisfied.

According to the configuration above, when the working machine is left unattended in the first state, the working machine is automatically switched from the first state to the second state by the second state switching process executed by the control unit. However, while the working machine is held by the working machine holder, the second state switching process is less likely to be executed, as compared to while the working machine is not held by the working machine holder. Thus, while the working machine is held by the working machine holder, the working machine is suppressed from automatically switching from the first state to the second state. This can reduce bothersome the user would feel and thus improves the usability of the working machine.

The wording "unattended time period of the working machine" used herein means any time period during which the user does not use the working machine and leaves the working machine unattended. The unattended time period of the working machine can include for example a time period during which the manipulation unit of the working machine is not continuously manipulated (no-manipulation time period), a time period during which the working machine is continuously held by the working machine holder (holder holding time period), etc.

DESCRIPTION

Figure 1:
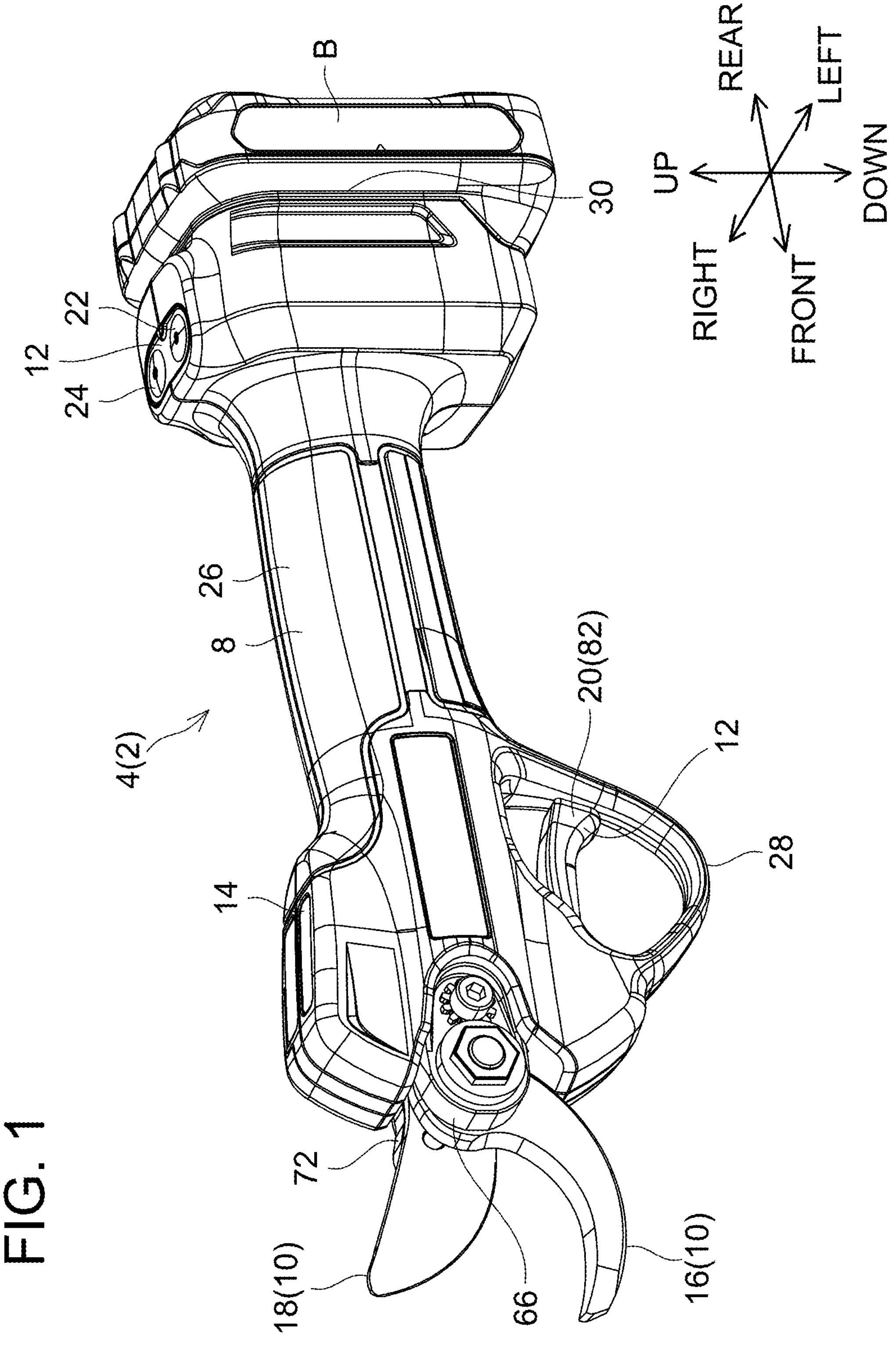
FIG. 1 shows a perspective view of pruners 4 of a working machine system 2 according to a first embodiment.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved working machine systems and working machines as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, the manipulation unit may include a trigger manipulation member that functions as a trigger to cause the working unit to perform the working operation. The first state may be an active state in which the control unit operates the electric motor to cause the working unit to perform the working operation when the trigger manipulation member is manipulated. The second state may be a standby state in which the control unit does not cause the working unit to perform the working operation even when the trigger manipulation member is manipulated. The switching manipulation may include an active switching manipulation to the trigger manipulation member. The second state switching process may be a standby state switching process in which the control unit switches the working machine from the active state to the standby state.

If the working machine is automatically switched from the active state to the standby state while the working machine is held by the working machine holder, the user has to perform the active switching manipulation to switch the working machine from the standby state to the active state in order to use the working machine after taking it out from the working machine holder. This bothers the user and decreases usability of the working machine. According to the configuration above, the working machine is suppressed from automatically switching from the active state to the standby state while the working machine is held by the working machine holder. Thus, the user does not have to perform the active switching manipulation in order to use the working machine after taking it out from the working machine holder. Thus, the configuration above can reduce bothersome the user would feel and thus improve the usability of the working machine.

In one or more embodiments, the manipulation unit may include a power switch member. The first state may be a power-on state in which power is supplied from the power source to the control unit. The second state may be a power-off state in which power is not supplied from the power source to the control unit. The switching manipulation may include a manipulation to the power switch member. The second state switching process may be a power-off state switching process in which the control unit switches the working machine from the power-on state to the power-off state.

If the working machine is automatically switched from the power-on state to the power-off state while the working machine is held by the working machine holder, the user has to perform the manipulation to the power switch member to switch the working machine from the power-off state to the power-on state, in order to use the working machine after taking it out from the working machine holder. This bothers the user and decreases usability of the working machine. According to the configuration above, the working machine is suppressed from automatically switching from the power-on state to the power-off state while the working machine is held by the working machine holder. Thus, the user does not have to perform the manipulation to the power switch member when using the working machine after taking it out from the working machine holder. Thus, the configuration above can reduce bothersome the user would feel and thus improve the usability of the working machine.

In one or more embodiments, the working machine may further include a switching circuit configured to selectively connect and disconnect the power source and the electric motor. When the detection mechanism detects that the working machine is not held by the working machine holder, the switching circuit may electrically connect the power source and the electric motor. When the detection mechanism detects that the working machine is held by the working machine holder, the switching circuit may electrically disconnect the power source and the electric motor.

Generally speaking, it is expected that the operation by the working machine is not ongoing while the working machine is held by the working machine holder. Thus, there is no problem to prohibit the power supply from the power source to the electric motor while the working machine is held by the working machine holder. Rather, if the power supply from the power source to the electric motor is permitted while the working machine is held by the working machine holder, power may be unnecessarily consumed. In the configuration above, the power supply from the power source to the electric motor is prohibited while the working machine is held by the working machine holder. Thus, the unnecessary power consumption can be suppressed.

In one or more embodiments, the switching circuit may be configured to operate independent from the control unit.

If the switching circuit cooperates with the control unit, a malfunction of the control unit may result in abnormal operation of the switching circuit. As a result, the switching circuit may permit the power supply from the power source to the electric motor even while the working machine is held by the working machine holder, or the switching circuit may prohibit the power supply from the power source to the electric motor even when the working machine is not held by the working machine holder. In the configuration above, the switching circuit operates independent from the control unit, and thus the switching circuit can operate normally even when the control unit malfunctions. Therefore, the power supply from the power source to the electric motor is suppressed while the working machine is held by the working machine holder, and the power supply from the power source to the electric motor is permitted when the working machine is not held by the working machine holder.

In one or more embodiments, the working unit may include a first blade and a second blade movable between an open position and a closed position relative to the first blade. The working operation may be an operation in which the second blade is moved from the open position to the closed position.

In the configuration above, the working machine functions as scissors for cutting an object (e.g., branches of a tree). Work with the scissors may be accompanied by other work (e.g., gathering cut pieces of the object cut by the scissors). Thus, in case of the working machine functioning as scissors, it is expected that the user would frequently put the working machine back to the working machine holder to perform the other work. In this case, the user may be bothered if the working machine automatically switches from the first state to the second state while the working machine is held by the working machine holder. For the configuration above, the effect of suppressing the working machine from automatically switching from the first state to the second state while the working machine is held by the working machine holder is remarkably advantageous.

In one or more embodiments, the detection mechanism may include a magnetic sensor disposed in one of the working machine and the working machine holder and a magnet disposed in the other of the working machine and the working machine holder.

In the configuration above, the detection mechanism is implemented with a simple configuration.

In one or more embodiments, the working machine holder may further include a protrusion protruding from an inner surface of the case portion and configured to contact the working machine. The detection mechanism may include a detector and a detection target configured to be detected by the detector. One of the detector and the detection target may be disposed in the working machine. The other of the detector and the detection target may be disposed in the protrusion of the working machine holder.

If the relative positional relationship between the detector and the detection target varies when the working machine holder holds the working machine, the detection accuracy of the detection mechanism may thereby be decreased. In the configuration above, the other of the detector and the detection target is disposed in the protrusion of the working machine holder which is configured to contact the working machine, and thus the other of the detector and the detection target is located near the working machine, i.e., the one of the detector and the detection target disposed in the working machine, when the working machine is held by the working machine holder. This reduces variation in the relative positional relationship between the detector and the detection target when the working machine holder holds the working machine and thus improves the detection accuracy of the detection mechanism.

First Embodiment: Working Machine System 2

Figure 2:
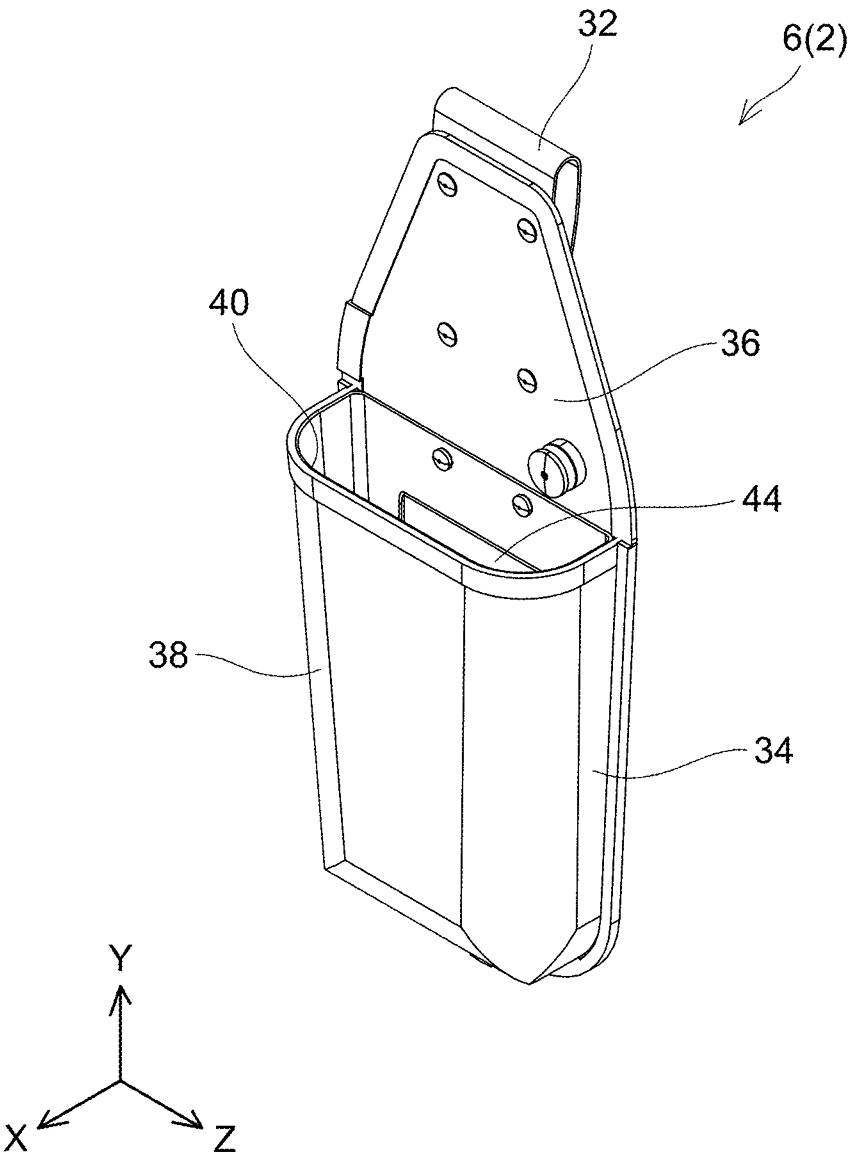
FIG. 2 shows a perspective view of a holster 6 of the working machine system 2 according to the first embodiment.

As shown in FIGS. 1 and 2, a working machine system 2 comprises pruners 4 and a holster 6.

The pruners 4 shown in FIG. 1 is mainly used to cut branches of trees, etc. The pruners 4 are an electrically powered working machine configured to operate with power supplied from a battery pack B. The pruners 4 are portable and configured to be gripped by a user with one hand.

The pruners 4 comprise a housing 8, a scissors unit 10 configured to perform a cutting operation, a manipulation unit 12 configured to be manipulated by the user, and a display unit 14 configured to display various information to the user. The scissors unit 10 comprises a fixed blade 16 and a movable blade 18 that is rotatable relative to the fixed blade 16. The manipulation unit 12 comprises a trigger lever 20, a power switch 22, and an open position adjustment switch 24. The pruners 4 rotate the movable blade 18 relative to the fixed blade 16 in response to the trigger lever 20 being pulled up, which will be described in detail later. The housing 8 comprises a grip 26 configured to be gripped by the user with one hand, a protector 28 that protects user's finger(s) used to pull up the trigger lever 20, and a battery receptacle 30 to which the battery pack B is detachably attached.

In the disclosure herein, the longitudinal direction of the grip 26 is defined as a front-rear direction. Regarding the front-rear direction, the direction from the grip 26 toward the scissors unit 10 is defined as a front direction and the opposite direction is defined as a rear direction. A direction that is orthogonal to the front-rear direction and along the rotation axis of the movable blade 18 is defined as a right-left direction. Regarding the right-left direction, the direction from the movable blade 18 toward the fixed blade 16 is defined as a left direction and the opposite direction is defined as a right direction. The direction orthogonal to the front-rear direction and the right-left direction is defined as an up-down direction. Regarding the up-down direction, the direction from the protector 28 toward the trigger lever 20 is defined as an up direction and the opposite direction is defined as a down direction.

The battery pack B houses a rechargeable secondary battery such as a lithium-ion battery or the like. The battery pack B is attached to the battery receptacle 30 by being slid upward toward the battery receptacle 30 of the housing 8. The battery pack B is detached from the battery receptacle 30 by being slid downward relative to the battery receptacle 30.

The power switch 22 and the open position adjustment switch 24 are located rearward of the rear end of the grip 26 and on a portion of the upper surface of the housing 8. The power switch 22 is used to switch the main power of the pruners 4 between on and off. The open position adjustment switch 24 is used to adjust an open position of the movable blade 18 (which will be described in detail later). The display unit 14 is located forward of the front end of the grip 26 and on a portion of the upper surface of the housing 8. The display unit 14 comprises an LED (not shown) configured to display whether the main power is on or off, etc.

The holster 6 shown in FIG. 2 is a tool by which the pruners 4 are temporarily held in the course of user's work with the pruners 4. The holster 6 comprises a loop portion 32 detachably attached to a waist belt (not shown) wrapped around the user's waist and a case portion 34 configured to house the pruners 4. The user can attach the holster 6 to the waist belt by inserting the waist belt through the loop portion 32. The case portion 34 comprises a flat plate 36, a pocket 38 located on one surface of the plate 36, and an opening 40 defined between the plate 36 and the pocket 38. The loop portion 32 is located on a surface of the plate 36 that is opposite to the surface on which the pocket 38 is located.

In the disclosure herein, the direction orthogonal to the plate 36 is defined as X direction. Regarding X direction, the direction from the plate 36 toward the pocket 38 is defined as +X direction and the direction from the plate 36 toward the loop portion 32 is defined as −X direction. A direction that is orthogonal to X direction and along the longitudinal direction of the holster 6 is defined as Y direction. Regarding Y direction, the direction from the inside toward the outside of the case portion 34 via the opening 40 is defined as +Y direction and the direction from the outside toward the inside of the case portion 34 via the opening 40 is defined as −Y direction. The direction that is orthogonal to X and Y directions and parallel to the plate 36 of the holster 6 is defined as Z direction.

Figure 3:
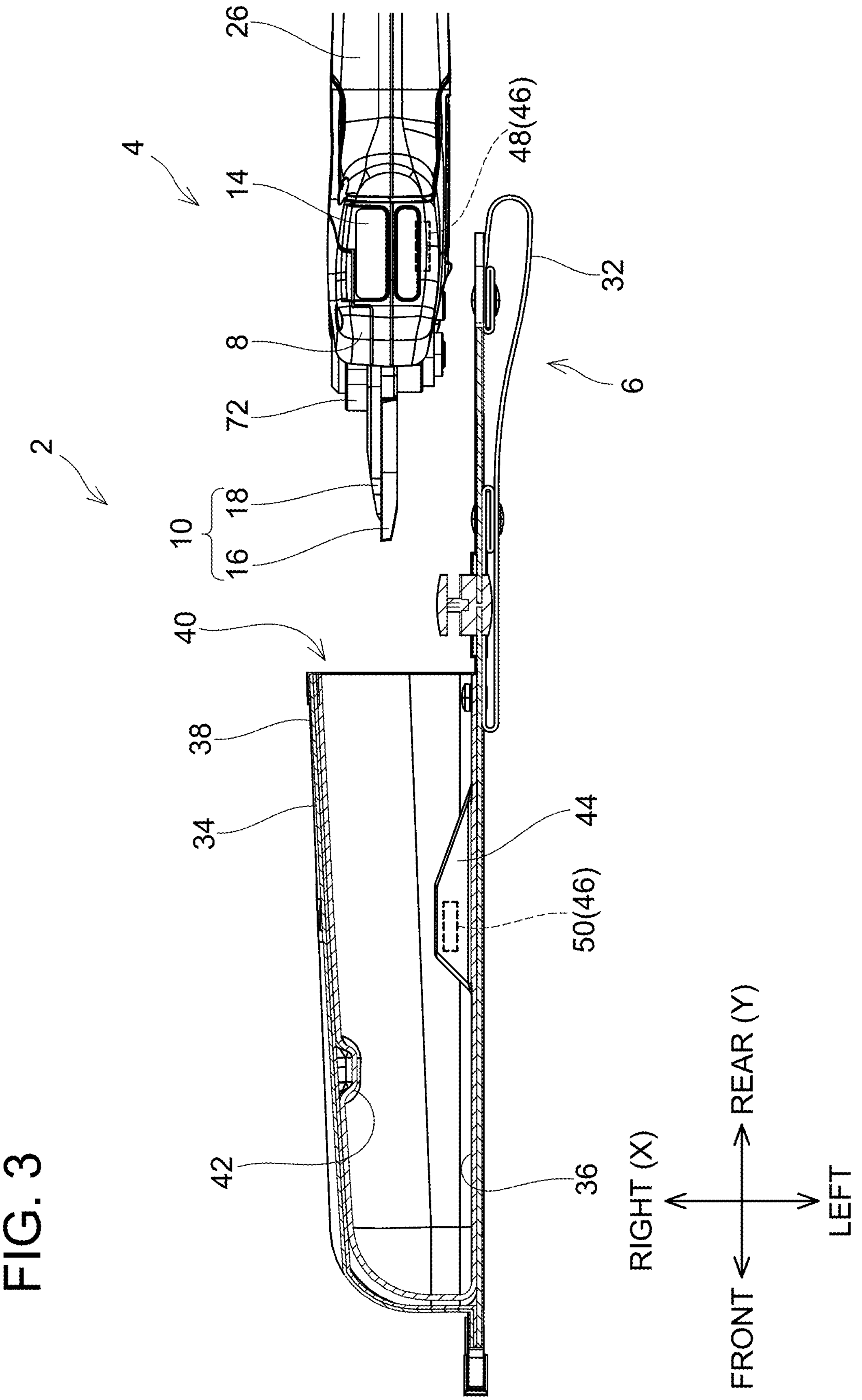
FIG. 3 shows how the pruners 4 are taken out from the holster 6 in the working machine system 2 according to the first embodiment.
Figure 4:
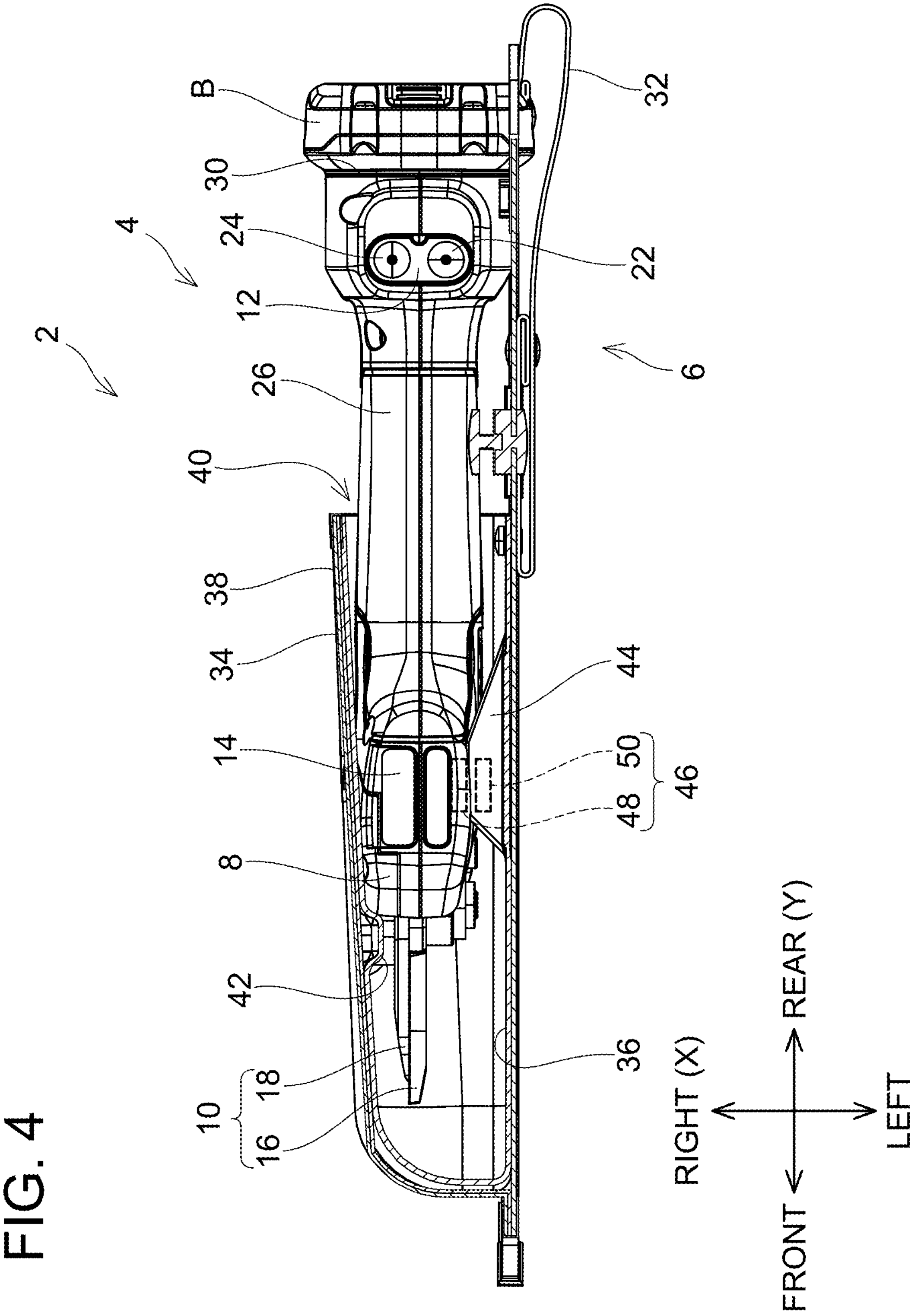
FIG. 4 shows how the pruners 4 are held by the holster 6 in the working machine system 2 according to the first embodiment.

As shown in FIGS. 3 and 4, when the front direction of the pruners 4 is in line with −Y direction and the left direction of the pruners 4 is in line with −X direction, a front portion of the pruners 4 including the scissors unit 10 can pass through the opening 40 in the front-rear direction (Y direction). Thus, the user can take the front portion of the pruners 4 in and out of the case portion 34 via the opening 40. A first protrusion 42 and a second protrusion 44 are formed on the inner surface of the case portion 34. The first protrusion 42 protrudes in −X direction from the −X direction surface of the pocket 38, and the second protrusion 44 protrudes in +X direction from the +X direction surface of the plate 36. As shown in FIG. 4, when the pruners 4 are held by the holster 6, the first protrusion 42 contacts the front surface of the housing 8 from the front. This prevents the pruners 4 from moving farther in −Y direction. Further, the second protrusion 44 contacts the left surface of the housing 8 so that the pruners 4 are pressed against the −X direction surface of the pocket 38. This prevents the pruners 4 from rattling against the case portion 34. When the pruners 4 are held by the holster 6, the scissors unit 10 does not contact the inner surface of the case portion 34 regardless of the position of the movable blade 18. Thus, the scissors unit 10 is unlikely to interfere with the case portion 34 when the user takes the pruners 4 in and out of the case portion 34. Therefore, the user can smoothly take the pruners 4 in and out of the case portion 34.

The working machine system 2 further comprises a detection mechanism 46 configured to detect whether the pruners 4 are held by the holster 6 or not (specifically, whether the scissors unit 10 is in the case portion 34 or not). The detection mechanism 46 comprises a holster detection sensor 48 located in the pruners 4 and a magnet 50 located in the holster 6. The holster detection sensor 48 is for example a magnetic sensor with a Hall element and is configured to detect whether the magnet 50 is nearby or not. The holster detection sensor 48 is located within the housing 8 and forward of the front end of the grip 26. The magnet 50 is located within the second protrusion 44. When the pruners 4 are held by the holster 6 as shown in FIG. 4, the position of the holster detection sensor 48 in Y direction is substantially coincident with the position of the magnet 50 in Y direction. Thus, when the pruners 4 are held by the holster 6 (specifically, the scissors unit 10 is in the case portion 34), the magnet 50 is positioned near the holster detection sensor 48. Conversely, when the pruners 4 are not held by the holster 6 (specifically, when the scissors unit 10 is not in the case portion 34) as shown in FIG. 3, the magnet 50 is relatively distanced from the holster detection sensor 48. Thus, the holster detection sensor 48 can detect whether the pruners 4 are held by the holster 6 or not by detecting whether the magnet 50 is nearby or not.

Figure 5:
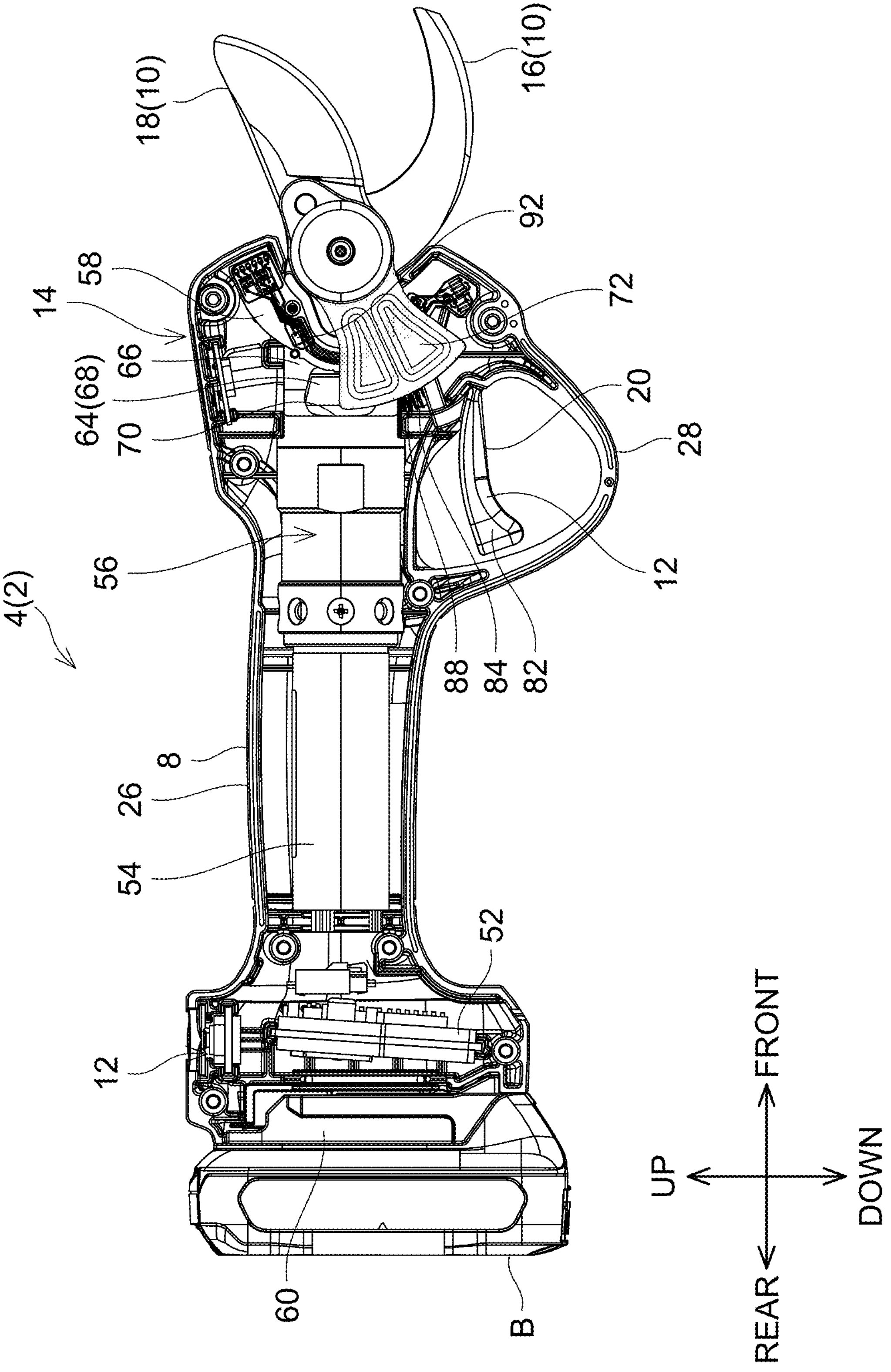
FIG. 5 shows a right side view of an internal structure of the pruners 4 of the working machine system 2 according to the first embodiment.

As shown in FIG. 5, the pruners 4 further comprise a control device 52, an electric motor 54, a power transmission 56, a sensor board 58, and a power interface 60. The control device 52, the electric motor 54, the power transmission 56, and the sensor board 58 are housed in the housing 8.

The power interface 60 is located at the rear end of the battery receptacle 30. The power interface 60 comprises a connection terminal (not shown) for electrical connection with the battery pack B. The battery pack B supplies power to the pruners 4 via the power interface 60.

The electric motor 54 is for example a DC brushless motor and for example a coreless motor. The electric motor 54 comprises a rotation detection sensor 62 (see FIG. 8) configured to detect a rotation angle of the rotor (not shown). The electric motor 54 is located within the grip 26. The output shaft (not shown) of the electric motor 54 extends in the front-rear direction.

The power transmission 56 comprises a planetary gear mechanism (not shown) coupled to the output shaft (not shown) of the electric motor 54, a gear shaft 64 coupled to the planetary gear mechanism, and a gear housing 66 that houses the planetary gear mechanism and the gear shaft 64. The planetary gear mechanism reduces the rotation of the output shaft and transmits it to the gear shaft 64. A bevel gear 68 is formed on a front portion of the gear shaft 64. The bevel gear 68 meshes with a bevel gear 74 formed on the left surface of a gear piece 72 (see FIG. 7) via an opening 70 defined in the right surface of the gear housing 66. The gear piece 72 is fixed to the movable blade 18. Thus, when the electric motor 54 rotates forward, the movable blade 18 rotates clockwise in the right side view, i.e., the movable blade 18 moves toward the fixed blade 16. When the electric motor 54 rotates reversely, the movable blade 18 rotates counterclockwise in the right side view, i.e., the movable blade 18 moves away from the fixed blade 16.

Figure 6:
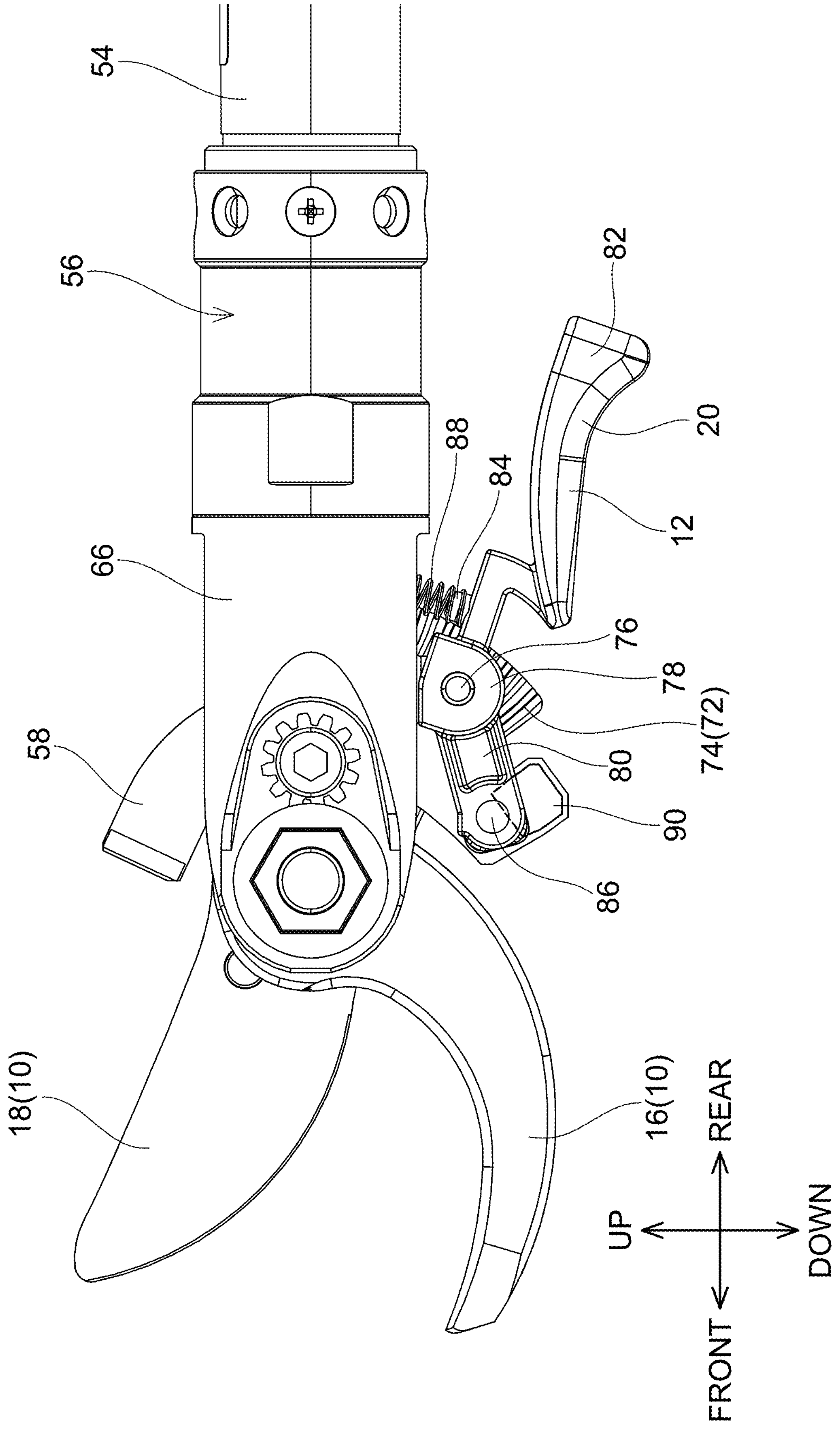
FIG. 6 shows a left side view of the vicinity of a scissors unit 10 of the working machine system 2 according to the first embodiment, where a movable blade 18 is in an open position.
Figure 7:
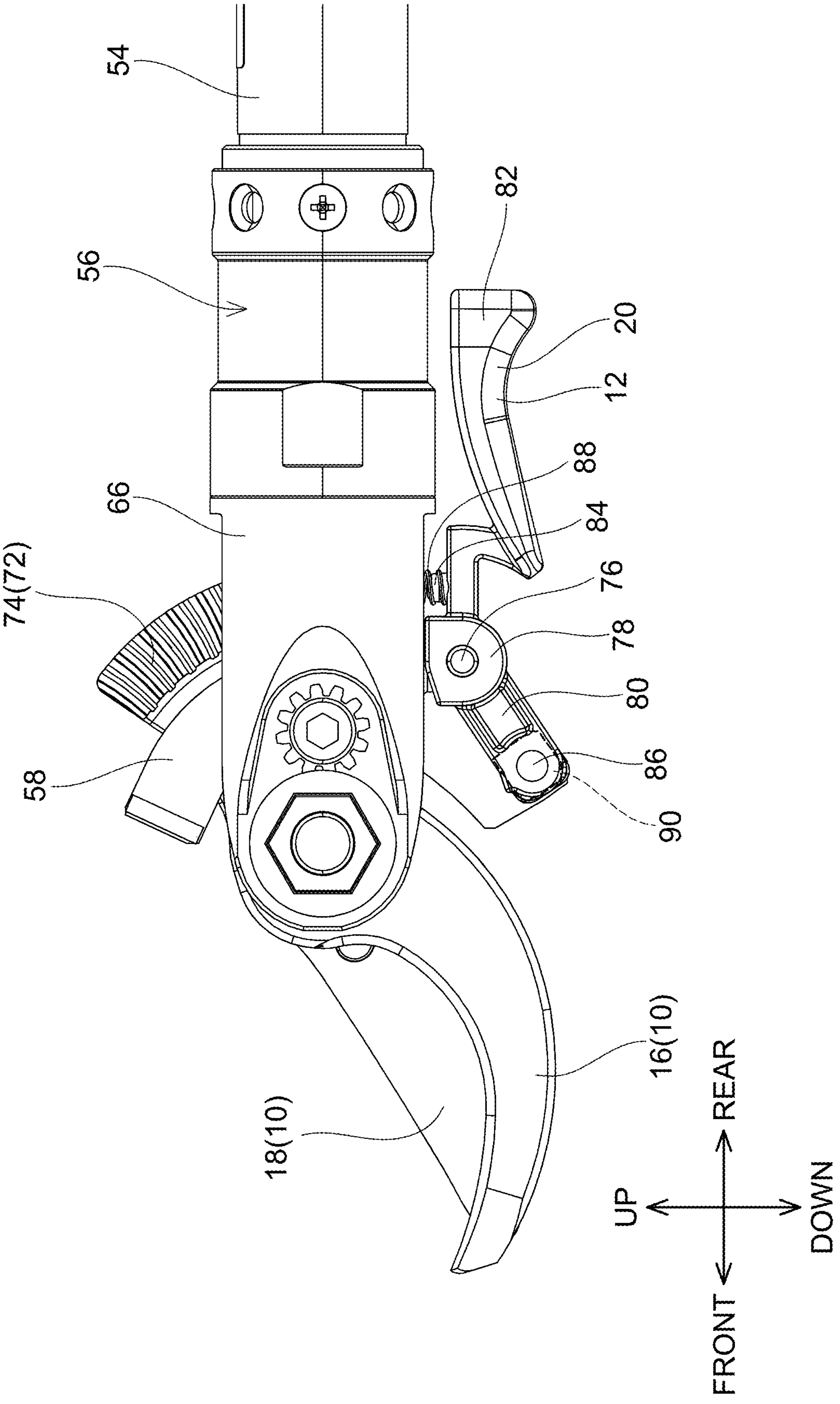
FIG. 7 shows a left side view of the vicinity of the scissors unit 10 of the working machine system 2 according to the first embodiment, where the movable blade 18 is in a closed position.

As shown in FIG. 6, the trigger lever 20 comprises a coupling portion 78 rotatably coupled to the gear housing 66 via a pin 76, a front arm 80 extending forward from the coupling portion 78, a rear arm 82 extending rearward from the coupling portion 78, and a protruding portion 84 protruding upward from the upper surface of the rear arm 82. A magnet 86 is fixed to an end of the front arm 80. The rear arm 82 is partially exposed to the outside of the housing 8. The rear arm 82 is configured to be manipulated by the user. A coil spring 88 is arranged around the protruding portion 84. The coil spring 88 is received in a recess (not shown) defined in the lower surface of the gear housing 66. The coil spring 88 biases the rear arm 82 of the trigger lever 20 downward relative to the gear housing 66. While the trigger lever 20 is not manipulated by the user, the trigger lever 20 is retained in the position shown in FIG. 6 by the biasing force of the coil spring 88. When the user pulls up the trigger lever 20 (specifically, the rear arm 82), the trigger lever 20 is rotated counterclockwise in the left side view against the biasing force of the coil spring 88. When the user fully pulls up the trigger lever 20, the trigger lever 20 is positioned as shown in FIG. 7.

The sensor board 58 is fixed to the gear housing 66. The sensor board 58 comprises a trigger position detection sensor 90 configured to detect the position of the trigger lever 20. The trigger position detection sensor 90 is located in a lower portion of the left surface of the sensor board 58 (i.e., the surface facing the right surface of the trigger lever 20). The trigger position detection sensor 90 is for example a magnetic sensor with a Hall element and is configured to detect whether the magnet 86 is nearby or not. The trigger position detection sensor 90 can detect whether the trigger lever 20 has been pulled up or not by detecting whether the magnet 86 is nearby or not.

The sensor board 58 further comprises a plurality of movable blade position detection sensors 92 (see FIG. 5, only partially shown) configured to detect the position of the movable blade 18. The plurality of movable blade position detection sensors 92 is located on the right surface of the sensor board 58 (i.e., the surface facing the left surface of the gear piece 72). A magnet (not shown) is fixed to the left surface of the gear piece 72. Each of the movable blade position detection sensors 92 is for example a magnetic sensor with a Hall element and is configured to detect whether the magnet on the left surface of the gear piece 72 is nearby or not. The plurality of movable blade position detection sensors 92 can detect the position of the movable blade 18 (i.e., the position of the movable blade 18 relative to the fixed blade 16) by each movable blade position detection sensor 92 detecting whether the magnet is nearby or not.

Configuration of Control Device 52

Figure 8:
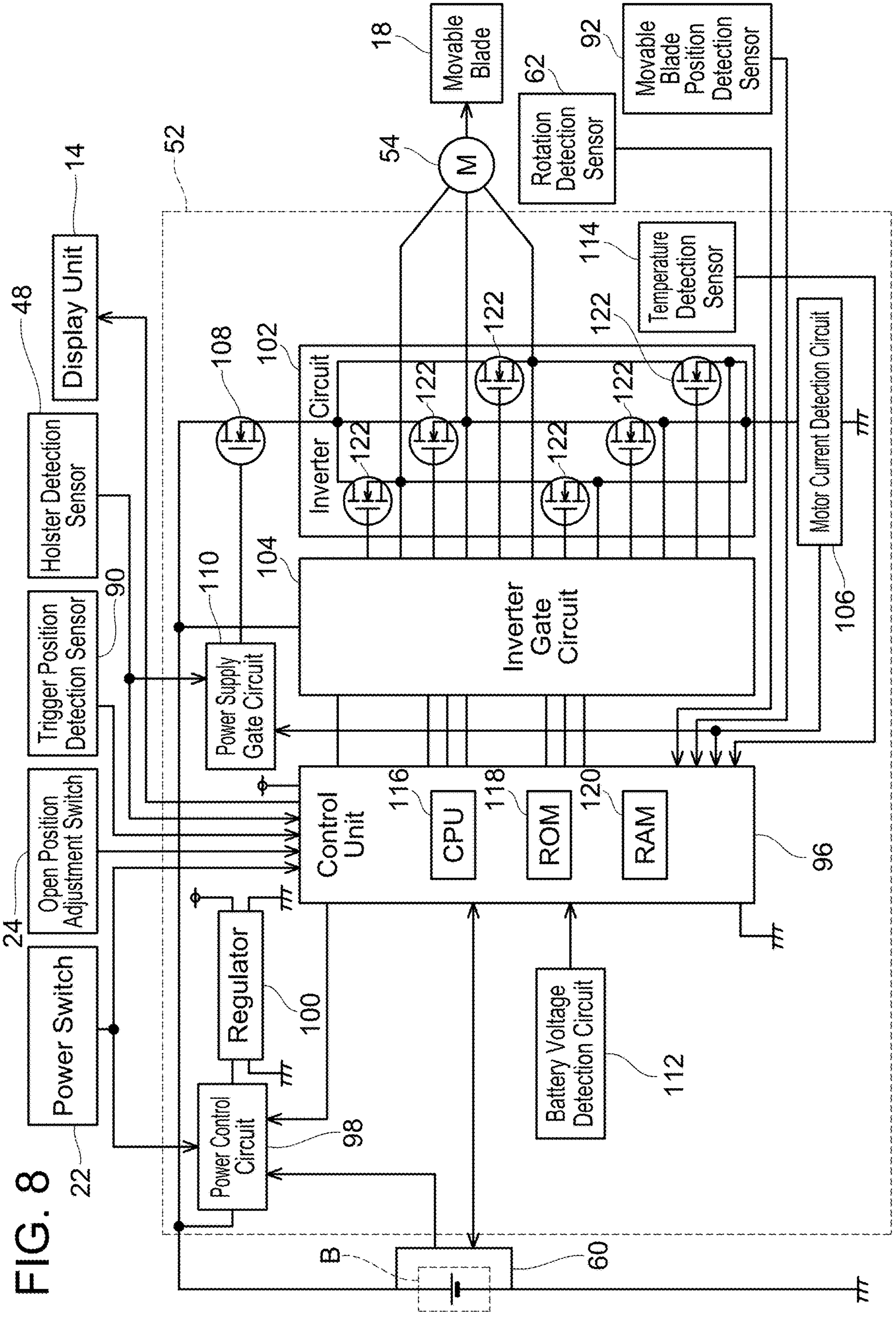
FIG. 8 shows a block diagram schematically illustrating an electric system of the pruners 4 of the working machine system 2 according to the first embodiment.

As shown in FIG. 8, the control device 52 comprises a control unit 96, a power control circuit 98, a regulator 100, an inverter circuit 102, an inverter gate circuit 104, a motor current detection circuit 106, a power supply switch 108, a power supply gate circuit 110, a battery voltage detection circuit 112, and a temperature detection sensor 114.

The control unit 96 is a so-called microcomputer comprising a CPU 116, a ROM 118, and a RAM 120. The ROM 118 stores various operation programs. The RAM 120 temporarily stores various signals inputted to the control unit 96 and various data created by the CPU 116 executing processes. The control unit 96 controls the pruners 4 by the CPU 116 executing processes according to the information stored in the ROM 118 and the RAM 120. The control unit 96 is electrically connected to electric components of the pruners 4 (e.g., the holster detection sensor 48, the power switch 22, the open position adjustment switch 24, the display unit 14, the power interface 60, the electric motor 54, the rotation detection sensor 62, the plurality of movable blade position detection sensors 92, the trigger position detection sensor 90). The control unit 96 can bidirectionally communicate with the battery pack B via the power interface 60.

The power control circuit 98 and the regulator 100 adjust the power from the battery pack B to a predetermined voltage (e.g., 5 V) and output it to the control unit 96. The power outputted to the control unit 96 via the power control circuit 98 and the regulator 100 is used for the control unit 96 to operate, i.e., used as the main power for the pruners 4. The power control circuit 98 is electrically connected to the power switch 22, the control unit 96, and the power interface 60. The power control circuit 98 switches the main power of the pruners 4 between on and off in response to the power switch 22 being manipulated. The power control circuit 98 switches the main power of the pruners 4 to off when the control unit 96 outputs a main power off signal. The power control circuit 98 switches the main power of the pruners 4 to off when the battery pack B outputs an emergency off signal via the power interface 60. The emergency off signal herein is a signal that is outputted for example when an abnormality (e.g., overheat) occurs in the battery pack B. In the disclosure herein, the state in which the main power of the pruners 4 is on and the state in which the main power of the pruners 4 is off may be simply termed “power-on state” and “power-off state”, respectively.

The inverter circuit 102 comprises six switches 122 (e.g., FETs). The control unit 96 can generate a three-phase alternate current to be supplied to the electric motor 54 by controlling on/off of the six switches 122 via the inverter gate circuit 104.

The motor current detection circuit 106 detects a current to be supplied to the inverter circuit 102, i.e., a current to be supplied to the electric motor 54 and outputs it to the control unit 96 and the power supply gate circuit 110. Thus, for example, the control unit 96 can detect whether an extremely large current (so-called overcurrent) can flow in the electric motor 54 or not.

The power supply switch 108 is for example an FET. The power supply switch 108 is between the battery pack B and the electric motor 54, more specifically between the power interface 60 and the inverter circuit 102. The power supply switch 108 selectively connects and disconnects the battery pack B and the electric motor 54. When the power supply switch 108 is on, the battery pack B and the electric motor 54 are electrically connected, whereas when the power supply switch 108 is off, the battery pack B and the electric motor 54 are electrically disconnected.

The power supply gate circuit 110 is electrically connected to the holster detection sensor 48 and the motor current detection circuit 106. The power supply gate circuit 110 is configured to switch the power supply switch 108 between on and off based on signals outputted from the holster detection sensor 48 and the motor current detection circuit 106. The power supply gate circuit 110 is not communicable with the control unit 96. Thus, the power supply gate circuit 110 switches the power supply switch 108 between on and off independent from the control unit 96. In other words, the power supply switch 108 operates independent from the control unit 96.

For example, the power supply gate circuit 110 switches the power supply switch 108 to off when the holster detection sensor 48 outputs a holster detection signal indicating that the pruners 4 are held by the holster 6. The power supply gate circuit 110 switches the power supply switch 108 to on when the holster detection sensor 48 does not output the holster detection signal. Thus, the power supply to the electric motor 54 is permitted when the pruners 4 are not held by the holster 6, whereas the power supply to the electric motor 54 is prohibited when the pruners 4 are held by the holster 6.

The power supply gate circuit 110 is configured to determine whether an overcurrent is flowing in the electric motor 54 or not based on the detection result from the motor current detection circuit 106. When determining that an overcurrent is flowing in the electric motor 54, the power supply gate circuit 110 switches the power supply switch 108 to off. When determining that an overcurrent is not flowing in the electric motor 54, the power supply gate circuit 110 switches the power supply switch 108 to on. Thus, the power supply to the electric motor 54 is permitted when an overcurrent is not flowing in the electric motor 54, whereas the power supply to the electric motor 54 is prohibited when an overcurrent is flowing in the electric motor 54.

The battery voltage detection circuit 112 detects the voltage of the battery pack B (i.e., remaining charge of the battery pack B) and outputs it to the control unit 96. Thus, the control unit 96 can identify the voltage of the battery pack B.

The temperature detection sensor 114 detects the temperature of the inverter circuit 102 and outputs it to the control unit 96. Thus, the control unit 96 can identify the temperature of the inverter circuit 102.

Operation Modes of Pruners 4

In the power-on state, the pruners 4 selectively operate in a plurality of operation modes. The pruners 4 operate differently in the respective operation modes. Hereinafter, main operation modes of the pruners 4, namely a standby mode and an active mode, will be described.

Standby Mode

In the standby mode, the scissors unit 10 is prohibited from operating. In this embodiment, the operation mode of the pruners 4 is set to the standby mode immediately after the main power of the pruners 4 is switched from off to on. When the pruners 4 are in the standby mode, the control unit 96 prohibits the electric motor 54 from operating. Thus, in the standby mode, the electric motor 54 does not operate even when the trigger lever 20 is manipulated, so that the scissors unit 10 does not operate either.

Active Mode

In the active mode, the scissors unit 10 is permitted to operate. When the trigger lever 20 is in a zero position as shown in FIG. 6, the control unit 96 controls the electric motor 54 based on detection results from the movable blade position detection sensors 92 such that the movable blade 18 is retained in an open position relative to the fixed blade 16. When the trigger lever 20 is pulled up from the zero position as shown in FIG. 7, the control unit 96 controls the electric motor 54 based on detection results from the movable blade position detection sensors 92 such that the movable blade 18 is moved to a closed position. Thus, in the active mode, the pulling-up manipulation to the trigger lever 20 causes the scissors unit 10 to perform a cutting operation. When the open position adjustment switch 24 is manipulated in the active mode of the pruners 4, the control unit 96 switches the open position of the movable blade 18 when the trigger lever 20 in the zero position between a first open position and a second open position which is closer to the fixed blade 16 than the first open position. By using this function, the user can select a suitable open position for the thickness of an object to be cut.

First Mode Switching Process

Figure 9:
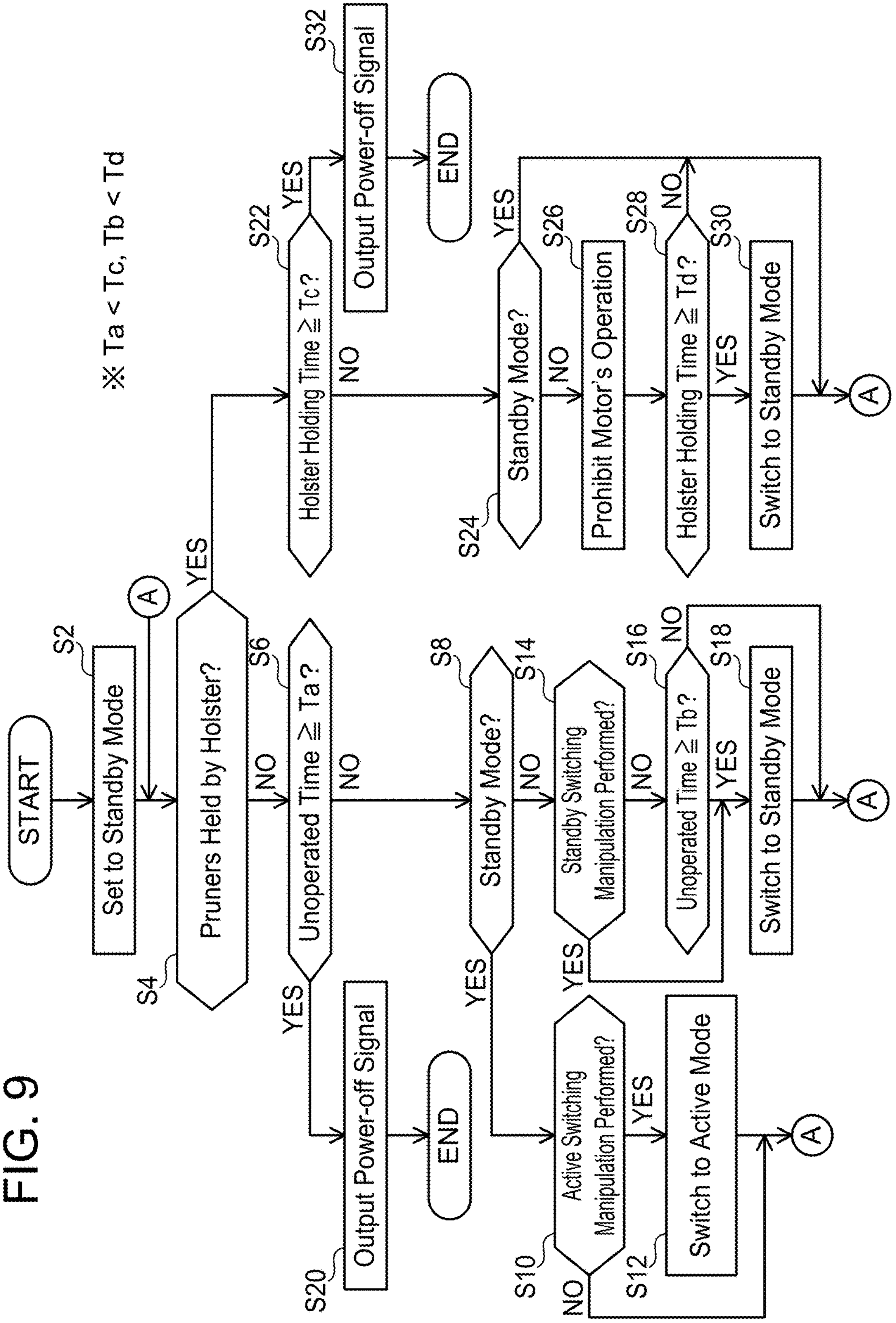
FIG. 9 shows a flowchart of a first mode switching process executed by a control unit 96 of the pruners 4 of the working machine system 2 according to the first embodiment.

A first mode switching process shown in FIG. 9 is a process for switching the operation modes of the pruners 4. The first mode switching process is started when the main power of the pruners 4 is switched from off to on.

In S2, the control unit 96 sets the operation mode of the pruners 4 to the standby mode. After S2, the process proceeds to S4.

In S4, the control unit 96 determines whether the pruners 4 are held by the holster 6 or not based on a signal outputted from the holster detection sensor 48 (see FIG. 8). Specifically, the control unit 96 determines whether the pruners 4 are held by the holster 6 or not according to a holster holding determination process (see FIG. 10), which will be described later. When the pruners 4 are not held by the holster 6 (NO in S4), the process proceeds to S6.

In S6, the control unit 96 determines whether a no-manipulation time period of the pruners 4 is equal to or over a predetermined time period Ta (e.g., 15 minutes). The no-manipulation time period of the pruners 4 herein means a time period during which the pruners 4 are in the power-on state and the manipulation unit 12 of the pruners 4 (specifically, the trigger lever 20 and/or the open position adjustment switch 24) (see FIG. 1) is not continuously manipulated. When the no-manipulation time period of the pruners 4 is less than the predetermined time period Ta (NO in S6), the process proceeds to S8.

In S8, the control unit 96 determines whether the operation mode of the pruners 4 is the standby mode or not. When the operation mode of the pruners 4 is the standby mode (YES in S8), the process proceeds to S10.

In S10, the control unit 96 determines whether a predetermined active switching manipulation has been performed to the trigger lever 20 (see FIG. 1) or not. The active switching manipulation herein is for example to pull up the trigger lever 20 twice within a predetermined time period (e.g., within one second). When the active switching manipulation has not been performed to the trigger lever 20 (NO in S10), the process returns to S4. When the active switching manipulation has been performed on the trigger lever 20 (YES in S10), the process proceeds to S12.

In S12, the control unit 96 switches the operation mode of the pruners 4 to the active mode. After S12, the process returns to S4.

When it is determined in S8 that the operation mode of the pruners 4 is not the standby mode (NO in S8), the process proceeds to S14. In S14, the control unit 96 determines whether a predetermined standby switching manipulation has been performed on the trigger lever 20 (see FIG. 1) or not. The standby switching manipulation herein is for example to keep the trigger lever 20 pulled up for a predetermined time period (e.g., for three seconds) or longer. When the standby switching manipulation has not been performed on the trigger lever 20 (NO in S14), the process proceeds to S16.

In S16, the control unit 96 determines whether the no-manipulation time period of the pruners 4 is equal to or over a predetermined time period Tb (e.g., five minutes). When the no-manipulation time period of the pruners 4 is less than the predetermined time period Tb (NO in S16), the process returns to S4.

When it is determined in S14 that the standby switching manipulation has been performed on the trigger lever 20 (YES in S14) or when it is determined in S16 that the no-manipulation time period of the pruners 4 is equal to or over the predetermined time period Tb (YES in S16), the process proceeds to S18. In S18, the control unit 96 switches the operation mode of the pruners 4 to the standby mode. After S18, the process returns to S4.

When it is determined in S6 that the no-manipulation time period of the pruners 4 is equal to or over the predetermined time period Ta (YES in S6), the process proceeds to S20. In S20, the control unit 96 outputs the main power off signal to the power control circuit 98 (see FIG. 8). As a result, the main power of the pruners 4 is switched to off and the process shown in FIG. 9 is terminated.

When it is determined in S4 that the pruners 4 are held by the holster 6 (YES in S4), the process proceeds to S22. In S22, the control unit 96 determines whether a holster holding time period of the pruners 4 is equal to or over a predetermined time period Tc (e.g., 30 minutes). The holster holding time period herein means a time period during which the pruners 4 are in the power-on state and the pruners 4 are continuously held by the holster 6. In this embodiment, the holster holding time period can be regarded as a time period during which the determination of YES keeps being made in S4. The predetermined time period Tc is longer than the predetermined time period Ta. When the holster holding time period of the pruners 4 is less than the predetermined time period Tc (NO in S22), the process proceeds to S24.

In S24, the control unit 96 determines whether the operation mode of the pruners 4 is the standby mode or not. When the operation mode of the pruners 4 is the standby mode (YES in S24), the process returns to S4. When the operation mode of the pruners 4 is not the standby mode (NO in S24), the process proceeds to S26.

In S26, the control unit 96 exceptionally prohibits the electric motor 54 from operating even when the operation mode of the pruners 4 is the active mode. "The control unit 96 prohibits the operation of the electric motor 54" herein specifically means that the control unit 96 does not control on/off of the switches 122 (see FIG. 8) via the inverter gate circuit 104 (see FIG. 8) even when the trigger lever 20 (see FIG. 1) is pulled up. This prevents the electric motor 54 from unnecessarily operating and also prevents the remaining charge in the battery pack B (see FIG. 8) from being unnecessarily consumed while the pruners 4 are held by the holster 6 during which it is expected that the user temporarily stops working with the pruners 4. When determining that the pruners 4 has been taken out from the holster 6 (i.e., NO in S4) after the electric motor 54 was prohibited from operating in S26, the control unit 96 permits the operation of the electric motor 54 again.

After S26, the process proceeds to S28. In S28, the control unit 96 determines whether the holster holding time period of the pruners 4 is equal to or over a predetermined time period Td (e.g., ten minutes). The predetermined time period Td is longer than the predetermined time period Tb. When the holster holding time period of the pruners 4 is less than the predetermined time period Td (NO in S28), the process returns to S4. When the holster holding time period of the pruners 4 is equal to or over the predetermined time period Td (YES in S28), the process proceeds to S30.

In S30, the control unit 96 switches the operation mode of the pruners 4 to the standby mode. After S30, the process returns to S4.

When it is determined in S22 that the holster holding time period is equal to or over the predetermined time period Tc (YES in S22), the process proceeds to S32. In S32, the control unit 96 outputs the main power off signal to the power control circuit 98 (see FIG. 8). As a result, the main power of the pruners 4 is switched to off and the process shown in FIG. 9 is terminated.

Holster Holding Determination Process

Figure 10:
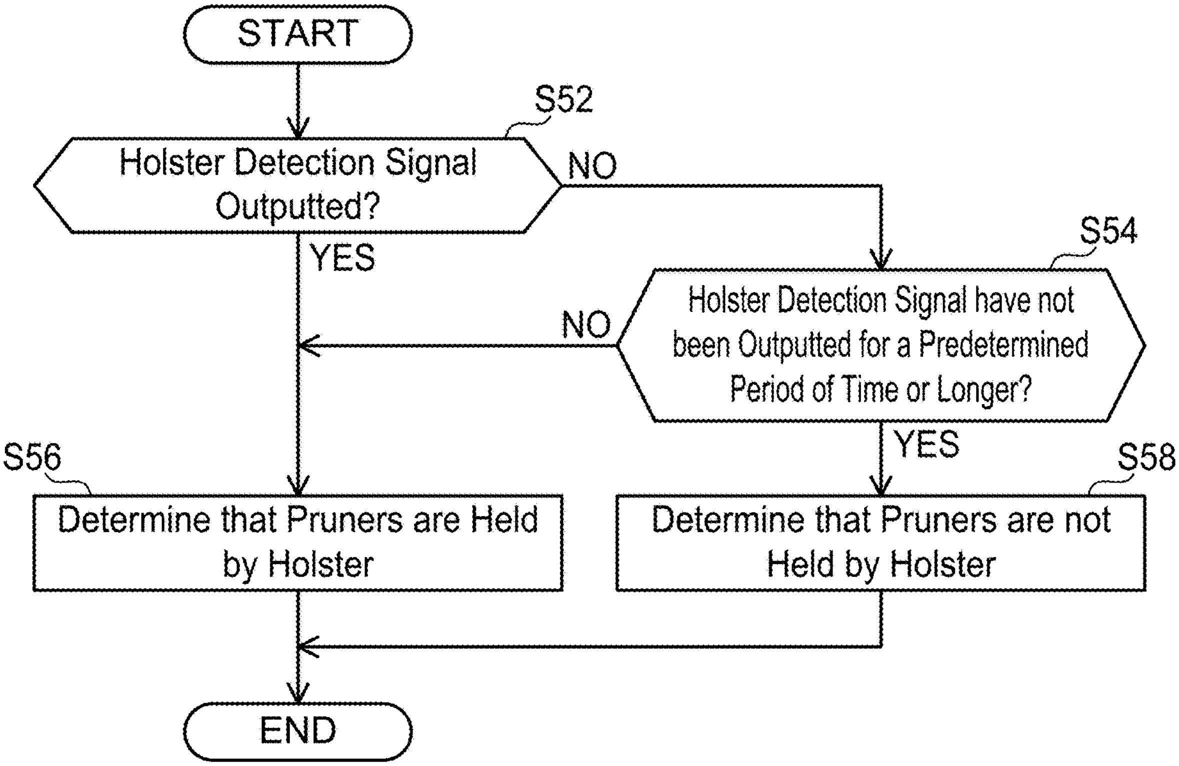
FIG. 10 shows a flowchart of a holster holding determination process executed by the control unit 96 of the pruners 4 of the working machine system 2 according to the first embodiment.

A holster holding determination process shown in FIG. 10 is repeated while the main power of the pruners 4 is on.

In S52, the control unit 96 determines whether the holster detection signal indicating that the pruners 4 are held by the holster 6 is outputted from the holster detection sensor 48 (see FIG. 8). When the holster detection signal is not outputted (NO in S52), the process proceeds to S54.

In S54, the control unit 96 determines whether a time period during which the holster detection signal is not outputted from the holster detection sensor 48 reaches or exceeds a predetermined time period (e.g., five seconds).

When it is determined in S52 that the holster detection signal is outputted (YES in S52) or when it is determined in S54 that the time period during which the holster detection signal is not outputted does not reach nor exceed the predetermined time period (NO in S54), the process proceeds to S56. In S56, the control unit 96 determines that the pruners 4 are held by the holster 6. After S56, the process shown in FIG. 10 is terminated.

When it is determined in S54 that the time period during which the holster detection signal is not outputted reaches or exceeds the predetermined time period (YES in S54), the process proceeds to S58. In S58, the control unit 96 determines that the pruners 4 are not held by the holster 6. After S58, the process shown in FIG. 10 is terminated.

According to the processes shown in FIGS. 9 and 10, the control unit 96 determines that the pruners 4 are held by the holster 6 until a predetermined time period elapses from when the pruners 4 were taken out from the holster 6, despite the fact that the pruners 4 are not held by the holster 6. Thus, until the predetermined time period elapses from when the pruners 4 were taken out from the holster 6, the operation of the electric motor 54 (see FIG. 8) is exceptionally prohibited (see S4, S22, S24, S26 in FIG. 9) even when the pruners 4 are in the active mode. Thus, even if the user unintentionally manipulates the trigger lever 20 (see FIG. 1) when taking the pruners 4 out from the holster 6, the scissors unit 10 (see FIG. 1) is not actuated. Therefore, in this embodiment, the pruners 4 can prevent the scissors unit 10 from being actuated due to an unintentional manipulation by the user.

Features of First Embodiment

As described, in one or more embodiments, the working machine system 2 comprises the pruners 4 (an example of working machine) including the scissors unit 10 (an example of working unit) configured to perform the cutting operation (an example of working operation), the electric motor 54 configured to drive the scissors unit 10, the manipulation unit 12 configured to be manipulated by the user, the power interface 60 (an example of power connection unit) configured to be connected to the battery pack B (an example of power source), and the control unit 96; the holster 6 (an example of working machine holder) including the case portion 34 configured to house at least the scissors unit 10 and the loop portion 32 (an example of attachment portion) configured to be detachably attached to the user; and the detection mechanism 46 configured to detect whether the pruners 4 are held by the holster 6. The pruners 4 are configured to be switched between the active mode (or the power-on state) (an example of first state) in which the cutting operation is permitted and the standby mode (or the power-off mode) (an example of second state) in which the cutting operation is prohibited and the active switching manipulation to the trigger lever 20 (or the manipulation to the power switch 22) (an example of predetermined switching manipulation to the manipulation unit) is required to switch to the active mode (or the power-on state). The control unit 96 is configured to execute the second state switching process (S16, S1, S28, S30 in FIG. 9) (or S6, S20, S22, S32 in FIG. 9) in which the control unit 96 switches the pruners 4 from the active mode (or the power-on state) to the standby mode (or the power-off state), in response to a predetermined condition being satisfied. When the detection mechanism 46 detects that the pruners 4 are not held by the holster 6 (NO in S4 of FIG. 9), the predetermined condition includes that the no-manipulation time period of the trigger lever 20 (an example of unattended time period of the working machine) is more than or equal to the predetermined time period Tb (or the predetermined time period Ta) (an example of first predetermined time period). When the detection mechanism 46 detects that the pruners 4 are held by the holster 6 (YES in S4 of FIG. 9), the predetermined condition includes that the holster holding time period (another example of the unattended time period of the working machine) is more than or equal to the predetermined time period Td (or the predetermined time period Tc) (an example of second predetermined time period) which is longer than the predetermined time period Tb (or the predetermined time period Ta).

According to the configuration above, when the pruners 4 are left unattended in the active mode (or in the power-on state), the pruners 4 are automatically switched from the active mode (or the power-on state) to the standby mode (the power-off state) by the second state switching process executed by the control unit 96. However, while the pruners

4 are held by the holster 6, the condition that triggers the second state switching process is less likely to be satisfied, as compared to while the pruners 4 are not held by the holster 6. Thus, while the pruners 4 are held by the holster 6, the pruners 4 are suppressed from automatically switching from the active mode (or the power-on state) to the standby mode (or the power-off state). This can reduce bothersome the user would feel and thus improves the usability of the pruners 4.

In one or more embodiments, the manipulation unit 12 includes the trigger lever 20 (an example of trigger manipulation member) configured to cause the scissors unit 10 to perform the cutting operation. The first state is the active mode (an example of active state) in which the control unit 96 operates the electric motor 54 to cause the scissors unit 10 to perform the cutting operation when the trigger lever 20 is manipulated. The second state is the standby mode (an example of standby state) in which the control unit 96 does not cause the scissors unit 10 to perform the cutting operation even when the trigger lever 20 is manipulated. The switching manipulation includes the active switching manipulation to the trigger lever 20. The second state switching process is the standby state switching process (S18, S30 in FIG. 9) in which the control unit 96 switches the pruners 4 from the active mode to the standby mode.

If the pruners 4 are automatically switched from the active mode to the standby mode while being held by the holster 6, the user has to perform the active switching manipulation to switch the pruners 4 from the standby mode to the active mode in order to use the pruners 4 after taking it out from the holster 6. This bothers the user and decreases usability of the pruners 4. According to the configuration above, the pruners 4 are suppressed from automatically switching from the active mode to the standby mode while being held by the holster 6. Thus, the user does not have to perform the active switching manipulation in order to use the pruners 4 after taking it out from the holster 6. Thus, the configuration above can reduce bothersome the user would feel and thus can improve the usability of the pruners 4.

In one or more embodiments, the manipulation unit 12 includes the power switch 22. The first state is the power-on state in which power is supplied from the battery pack B to the control unit 96. The second state is the power-off state in which power is not supplied from the battery pack B to the control unit 96. The switching manipulation includes the manipulation to the power switch 22. The second state switching process is the power-off state switching process (S20, S32 in FIG. 9) in which the control unit 96 switches the pruners 4 from the power-on state to the power-off state.

If the pruners 4 are automatically switched from the power-on state to the power-off state while being held by the holster 6, the user has to perform the manipulation to the power switch 22 to switch the pruners 4 from the power-off state to the power-on state, in order to use the pruners 4 after taking it out from the holster 6. This bothers the user and decreases usability of the pruners 4. According to the configuration above, the pruners 4 are suppressed from automatically switching from the power-on state to the power-off state while being held by the holster 6. Thus, the user does not have to perform the manipulation to the power switch 22 when using the pruners 4 after taking it out from the holster 6. Thus, the configuration above can reduce bothersome the user would feel and thus can improve the usability of the pruners 4.

In one or more embodiments, the pruners 4 further include the power supply switch 108 (an example of switching circuit) configured to selectively connect and disconnect the battery pack B and the electric motor 54. When the detection mechanism 46 detects that the pruners 4 are not held by the holster 6, the power supply switch 108 electrically connects the battery pack B and the electric motor 54. When the detection mechanism 46 detects that the pruners 4 are held by the holster 6, the power supply switch 108 electrically disconnects the battery pack B and the electric motor 54.

Generally speaking, it is expected that the operation by the pruners 4 is not ongoing while the pruners 4 are held by the holster 6. Thus, there is no problem to prohibit the power supply from the battery pack B to the electric motor 54 while the pruners 4 are held by the holster 6. Rather, if the power supply from the battery pack B to the electric motor 54 is permitted while the pruners 4 are held by the holster 6, power may be unnecessarily consumed. In the configuration above, the power supply from the battery pack B to the electric motor 54 is prohibited while the pruners 4 are held by the holster 6. Thus, the unnecessary power consumption can be suppressed.

In one or more embodiments, the power supply switch 108 is configured to operate independent from the control unit 96.

If the power supply switch 108 cooperates with the control unit 96, a malfunction of the control unit 96 may result in abnormal operation of the power supply switch 108. As a result, the power supply switch 108 may permit the power supply from the battery pack B to the electric motor 54 even while the pruners 4 are held by the holster 6, or the power supply switch 108 may prohibit the power supply from the battery pack B to the electric motor 54 even when the pruners 4 are not held by the holster 6. In the configuration above, the power supply switch 108 operates independent from the control unit 96, and thus the power supply switch 108 can operate normally even when the control unit 96 malfunctions. Therefore, the power supply from the battery pack B to the electric motor 54 is suppressed while the pruners 4 are held by the holster 6, and the power supply from the battery pack B to the electric motor 54 is permitted when the pruners 4 are not held by the holster 6.

In one or more embodiments, the scissors unit 10 includes the fixed blade 16 (an example of first blade) and the movable blade 18 (an example of second blade) movable between the open position and the closed position relative to the fixed blade 16. The cutting operation is an operation in which the movable blade 18 is moved from the open position to the closed position.

In the configuration above, the working machine functions as the pruners 4 for cutting an object (e.g., branches of a tree). Work with the pruners 4 may be accompanied by other work (e.g., gathering cut pieces of the object cut by the pruners 4). Thus, it is expected that the user would frequently put the pruners 4 back to the holster 6 to perform the other work. In this case, the user may be bothered if the pruners 4 automatically switch from the active mode (or the power-on state) to the standby mode (the power-off state) while the pruners 4 are held by the holster 6. For the configuration above, the effect of suppressing the pruners 4 from automatically switching from the active mode (the power-on state) to the standby state (the power-off state) while the pruners 4 are held by the holster 6 is remarkably advantageous.

In one or more embodiments, the detection mechanism 46 includes the holster detection sensor 48 (an example of magnetic sensor) disposed in the pruners 4 (an example of one of the working machine and the working machine holder) and the magnet 50 disposed in the holster 6 (an example of the other of the working machine and the working machine holder).

In the configuration above, the detection mechanism 46 is implemented with a simple configuration.

In one or more embodiments, the holster 6 further includes the second protrusion 44 (an example of protrusion) protruding from the inner surface of the case portion 34 and configured to contact the pruners 4. The detection mechanism 46 includes the holster detection sensor 48 (an example of detector) and the magnet 50 (an example of detection target) configured to be detected by the holster detection sensor 48. The holster detection sensor 48 (an example of one of the detector and the detection target) is disposed in the pruners 4. The magnet 50 (an example of the other of the detector and the detection target) is disposed in the second protrusion 44 of the holster 6.

If the relative positional relationship between the holster detection sensor 48 and the magnet 50 varies when the holster 6 holds the pruners 4, the detection accuracy of the detection mechanism 46 may thereby be decreased. In the configuration above, the magnet 50 is disposed in the protrusion of the holster 6 which is configured to contact the pruners 4, and thus the magnet 50 is located near the pruners 4, i.e., the holster detection sensor 48 disposed in the pruners 4, when the pruners 4 are held by the holster 6. This reduces variation in the relative positional relationship between the holster detection sensor 48 and the magnet 50 when the holster 6 holds the pruners 4 and thus improves the detection accuracy of the detection mechanism 46.

In one or more embodiments, the pruners 4 are configured to be held by the holster 6. The pruners 4 include the scissors unit 10 (an example of working unit) configured to perform the cutting operation (an example of working operation), the electric motor 54 configured to drive the scissors unit 10, the manipulation unit 12 configured to be manipulated by the user, the power interface 60 (an example of power connection unit) configured to be connected to the battery pack B (an example of power source), the holster detection sensor 48 (an example of detector) configured to detect whether the pruners 4 are held by the holster 6, and the control unit 96. The pruners 4 are configured to be switched between the active mode (or the power-on state) (an example of first state) in which the cutting operation is permitted and the standby mode (the power-off state) (an example of second state) in which the cutting operation is prohibited and the active switching manipulation to the trigger lever 20 (or the manipulation to the power switch 22) (an example of predetermined switching manipulation to the manipulation unit) is required to switch to the active mode (or the power-on state). The control unit 96 is configured to execute the second state switching process (S16, S18, S28, S30 in FIG. 9) (or S6, S20, S22, S32 in FIG. 9) in which the control unit 96 switches the pruners 4 from the active mode (or the power-on state) to the standby mode (or the power-off state) in response to a predetermined condition being satisfied. When the holster detection sensor 48 detects that the pruners 4 are not held by the holster 6 (NO in S4 of FIG. 9), the predetermined condition includes that the no-manipulation time period of the trigger lever 20 (an example of unattended time period of the working machine) is more than or equal to the predetermined time period Tb (or the predetermined time period Ta) (an example of first predetermined time period). When the holster detection sensor 48 detects that the pruners 4 are held by the holster 6 (YES in S4 of FIG. 9), the predetermined condition includes that the holster holding time period (another example of the unattended time period of the working machine) is more than or equal to the predetermined time period Td (or the predetermined time period Tc) (an example of second predetermined time period) which is longer than the predetermined time period Tb (or the predetermined time period Ta).

According to the configuration above, when the pruners 4 are left unattended in the active mode (or in the power-on state), the pruners 4 are automatically switched from the active mode (or the power-on state) to the standby mode (the power-off state) by the second state switching process executed by the control unit 96. However, while the pruners 4 are held by the holster 6, the condition that triggers the second state switching process is less likely to be satisfied, as compared to while the pruners 4 are not held by the holster 6. Thus, while the pruners 4 are held by the holster 6, the pruners 4 are suppressed from automatically switching from the active mode (or the power-on state) to the standby mode (or the power-off state). This can reduce bothersome the user would feel and thus improves the usability of the pruners 4.

Second Embodiment: Working Machine System 202

A working machine system 202 has almost the same configuration as that of the working machine system 2 according to the first embodiment (see FIGS. 1 to 10). The working machine system 202 is different from the working machine system 2 according to the first embodiment only in that the control unit 96 of the pruners 4 executes a second mode switching process shown in FIG. 11 instead of the first mode switching process (see FIG. 9). Hereinafter, only this difference is described and the other descriptions are omitted.

Second Mode Switching Process

As with the first mode switching process (see FIG. 9), the second mode switching process is started when the main power of the pruners 4 is switched from off to on. In the second mode switching process, S4 in the first mode switching process is replaced by S104 and S126 and S2 and S6 to S20 are the same as those of the first mode switching process. Therefore, descriptions for S2 and S6 to S20 in the second mode switching process are omitted and only S104 and S126 are described.

S104 follows S2. In S104, the control unit 96 determines whether the pruners 4 are held by the holster 6 or not according to the holster holding determination process (see FIG. 10). When the pruners 4 are not held by the holster 6 (NO in S104), the process proceeds to S6. When the pruners 4 are held by the holster 6 (YES in S104), the process proceeds to S126.

As with S26 in the first mode switching process (see FIG. 9), the control unit 96 prohibits the operation of the electric motor 54 in S126. After S126, the process returns to S104. When determining that the pruners 4 have been taken out from the holster 6 (i.e., NO in S104) after the operation of the electric motor 54 was prohibited in S126, the control unit 96 permits the operation of the electric motor 54 again.

Features of Second Embodiment

As above, in one or more embodiments, the working machine system 202 comprises the pruners 4 (an example of working machine) including the scissors unit 10 (an example of working unit) configured to perform the cutting operation (an example of working operation), the electric motor 54 configured to drive the scissors unit 10, the manipulation unit 12 configured to be manipulated by the user, the power interface 60 (an example of power connection unit) configured to be connected to the battery pack B (an example of power source), and the control unit 96; the holster 6 (an example of working machine holder) including the case portion 34 configured to house at least the scissors unit 10 and the loop portion 32 (an example of attachment portion) configured to be detachably attached to the user; and the detection mechanism 46 configured to detect whether the pruners 4 are held by the holster 6. The pruners 4 are configured to be switched between the active mode (or the power-on state) (an example of first state) in which the cutting operation is permitted and the standby mode (or the power-off state) (an example of second state) in which the cutting operation is prohibited and the active switching manipulation to the trigger lever 20 (or the manipulation to the power switch 22) (an example of predetermined switching manipulation to the manipulation unit) is required to switch to the active mode (or the power-on state). The control unit 96 is configured to execute the second state switching process (S18 in FIG. 11) (or S20 in FIG. 11) in which the control unit 96 switches the pruners 4 from the active mode (or the power-on state) to the standby mode (or the power-off state). When the detection mechanism 46 detects that the pruners 4 are not held by the holster 6 (NO in S104 in FIG. 11), the control unit 96 executes the second state switching process in response to the condition that the no-manipulation time period of the trigger lever 20 is equal to or more than the predetermined time period Tb or the condition that the standby switching manipulation is performed to the trigger lever 20 (or the condition that the no-manipulation time period of the trigger lever 20 reaches the predetermined time period Ta) (an example of predetermined condition) being satisfied. When the detection mechanism 46 detects that the pruners 4 are held by the holster 6 (YES in S104 of FIG. 11), the control unit 96 does not execute the second state switching process even when the condition that the no-manipulation time period of the trigger lever 20 is equal to or more than the predetermined time period Tb or the condition that the standby switching manipulation is performed to the trigger lever 20 (or the condition that the no-manipulation time period of the trigger lever 20 reaches the predetermined time period Ta) is satisfied.

According to the configuration above, when the pruners 4 are left unattended in the active mode (or the power-on state), the pruners 4 are automatically switched from the active mode (or the power-on state) to the standby mode (or the power-off state) by the second state switching process executed by the control unit 96. However, while the pruners 4 are held by the holster 6, the second state switching process is less likely to be executed, as compared to while the pruners 4 are not held by the holster 6. Thus, while the pruners 4 are held by the holster 6, the pruners 4 are suppressed from automatically switching from the active mode (or the power-on state) to the standby mode (or the power-off state). This can reduce bothersome the user would feel and thus improves the usability of the pruners 4.

In one or more embodiments, the manipulation unit 12 includes the trigger lever 20 (an example of trigger manipulation member) configured to cause the scissors unit 10 to perform the cutting operation. The first state is the active mode (an example of active state) in which the control unit 96 operates the electric motor 54 to cause the scissors unit 10 to perform the cutting operation when the trigger lever 20 is manipulated. The second state is the standby mode (an example of standby state) in which the control unit 96 does not cause the scissors unit 10 to perform the cutting operation even when the trigger lever 20 is manipulated. The switching manipulation includes the active switching manipulation to the trigger lever 20. The second state switching process is the standby state switching process (S18 in FIG. 11) in which the control unit 96 switches the pruners 4 from the active mode to the standby mode.

If the pruners 4 are automatically switched from the active mode to the standby mode while being held by the holster 6, the user has to perform the active switching manipulation to switch the pruners 4 from the standby mode to the active mode in order to use the pruners 4 after taking it out from the holster 6. This bothers the user, and decreases usability of the pruners 4. According to the configuration above, the pruners 4 are suppressed from automatically switching from the active mode to the standby mode while being held by the holster 6. Thus, the user does not have to perform the active switching manipulation in order to use the pruners 4 after taking it out from the holster 6. Thus, the configuration above can reduce bothersome the user would feel and thus improve the usability of the pruners 4.

In one or more embodiments, the manipulation unit 12 includes the power switch 22. The first state is the power-on state in which power is supplied from the battery pack B to the control unit 96. The second state is the power-off state in which power is not supplied from the battery pack B to the control unit 96. The switching manipulation includes the manipulation to the power switch 22. The second state switching process is the power-off state switching process (S20 in FIG. 11) in which the control unit 96 switches the pruners 4 from the power-on state to the power-off state.

If the pruners 4 are automatically switched from the power-on state to the power-off state while being held by the holster 6, the user has to perform the manipulation to the power switch 22 to switch the pruners 4 from the power-off state to the power-on state, in order to use the pruners 4 after taking it out from the holster 6. This bothers the user and decreases usability of the pruners 4. According to the configuration above, the pruners 4 are suppressed from automatically switching from the power-on state to the power-off state while being held by the holster 6. Thus, the user does not have to perform the manipulation to the power switch 22 when using the pruners 4 after taking it out from the holster 6. Thus, the configuration above can reduce bothersome the user would feel and thus can improve the usability of the pruners 4.

In one or more embodiments, the pruners 4 further include the power supply switch 108 (an example of switching circuit) configured to selectively connect and disconnect the battery pack B and the electric motor 54. When the detection mechanism 46 detects that the pruners 4 are not held by the holster 6, the power supply switch 108 electrically connects the battery pack B and the electric motor 54. When the detection mechanism 46 detects that the pruners 4 are held by the holster 6, the power supply switch 108 electrically disconnects the battery pack B and the electric motor 54.

Generally speaking, it is expected that the operation by the pruners 4 is not ongoing while the pruners 4 are held by the holster 6. Thus, there is no problem to prohibit the power supply from the battery pack B to the electric motor 54 while the pruners 4 are held by the holster 6. Rather, if the power supply from the battery pack B to the electric motor 54 is permitted while the pruners 4 are held by the holster 6, power may be unnecessarily consumed. In the configuration above, the power supply from the battery pack B to the electric motor 54 is prohibited while the pruners 4 are held by the holster 6. Thus, the unnecessary power consumption can be suppressed.

In one or more embodiments, the power supply switch 108 is configured to operate independent from the control unit 96.

If the power supply switch 108 cooperates with the control unit 96, a malfunction of the control unit 96 may result in abnormal operation of the power supply switch 108. As a result, the power supply switch 108 may permit the power supply from the battery pack B to the electric motor 54 even while the pruners 4 are held by the holster 6, or the power supply switch 108 may prohibit the power supply from the battery pack B to the electric motor 54 even when the pruners 4 are not held by the holster 6. In the configuration above, the power supply switch 108 operates independent from the control unit 96, and thus the power supply switch 108 can operate normally even when the control unit 96 malfunctions. Therefore, the power supply from the battery pack B to the electric motor 54 is suppressed while the pruners 4 are held by the holster 6, and the power supply from the battery pack B to the electric motor 54 is permitted when the pruners 4 are not held by the holster 6.

In one or more embodiments, the scissors unit 10 includes the fixed blade 16 (an example of first blade) and the movable blade 18 (an example of second blade) movable between the open position and the closed position relative to the fixed blade 16. The cutting operation is an operation in which the movable blade 18 is moved from the open position to the closed position.

In the configuration above, the working machine functions as the pruners 4 for cutting an object (e.g., branches of a tree). Work with the pruners 4 may be accompanied by other work (e.g., gathering cut pieces of the object cut by the pruners 4). Thus, it is expected that the user would frequently put the pruners 4 back to the holster 6 to perform the other work. In this case, the user may be bothered if the pruners 4 automatically switch from the active mode (or the power-on state) to the standby mode (the power-off state) while the pruners 4 are held by the holster 6. For the configuration above, the effect of suppressing the pruners 4 from automatically switching from the active mode (the power-on state) to the standby state (the power-off state) while the pruners 4 are held by the holster 6 is remarkably advantageous.

In one or more embodiments, the detection mechanism 46 includes the holster detection sensor 48 (an example of magnetic sensor) disposed in the pruners 4 (an example of one of the working machine and the working machine holder) and the magnet 50 disposed in the holster 6 (an example of the other of the working machine and the working machine holder).

In the configuration above, the detection mechanism 46 is implemented with a simple configuration.

In one or more embodiments, the holster 6 further includes the second protrusion 44 (an example of protrusion) protruding from the inner surface of the case portion 34 and configured to contact the pruners 4. The detection mechanism 46 includes the holster detection sensor 48 (an example of detector) and the magnet 50 (an example of detection target) configured to be detected by the holster detection sensor 48. The holster detection sensor 48 (an example of one of the detector and the detection target) is disposed in the pruners 4. The magnet 50 (an example of the other of the detector and the detection target) is disposed in the second protrusion 44 of the holster 6.

If the relative positional relationship between the holster detection sensor 48 and the magnet 50 varies when the holster 6 holds the pruners 4, the detection accuracy of the detection mechanism 46 may thereby be decreased. In the configuration above, the magnet 50 is disposed in the protrusion of the holster 6 which is configured to contact the pruners 4, and thus the magnet 50 is located near the pruners 4, i.e., the holster detection sensor 48 disposed in the pruners 4, when the pruners 4 are held by the holster 6. This reduces variation in the relative positional relationship between the holster detection sensor 48 and the magnet 50 when the holster 6 holds the pruners 4 and thus improves the detection accuracy of the detection mechanism 46.

In one or more embodiments, the pruners 4 are configured to be held by the holster 6. The pruners 4 include the scissors unit 10 (an example of working unit) configured to perform the cutting operation (an example of working operation), the electric motor 54 configured to drive the scissors unit 10, the manipulation unit 12 configured to be manipulated by the user, the power interface 60 (an example of power connection unit) configured to be connected to the battery pack B (an example of power source), the holster detection sensor 48 (an example of detector) configured to detect whether the pruners 4 are held by the holster 6, and the control unit 96. The pruners 4 are configured to be switched between the active mode (or the power-on state) (an example of first state) in which the cutting operation is permitted and the standby mode (the power-off state) (an example of second state) in which the cutting operation is prohibited and the active switching manipulation to the trigger lever 20 (or the manipulation to the power switch 22) (an example of predetermined switching manipulation to the manipulation unit) is required to switch to the active mode (or the power-on state). The control unit 96 is configured to execute the second state switching process (S18 in FIG. 11) (or S20 in FIG. 11) in which the control unit 96 switches the pruners 4 from the active mode (or the power-on state) to the standby mode (or the power-off state). When the holster detection sensor 48 detects that the pruners 4 are not held by the holster 6, the control unit 96 executes the second state switching process in response to the condition that the no-manipulation time period of the trigger lever 20 is equal to or more than the predetermined time period Tb or the condition that the standby switching manipulation is performed to the trigger lever 20 (or the condition that the no-manipulation time period of the trigger lever 20 reaches the predetermined time period Ta) (an example of predetermined condition) being satisfied. When the detection mechanism 46 detects that the pruners 4 are held by the holster 6 (YES in S104 of FIG. 11), the control unit 96 does not execute the second state switching process even when the condition that the no-manipulation time period of the trigger lever 20 is equal to or more than the predetermined time period Tb or the condition that the standby switching manipulation is performed on the trigger lever 20 (or the condition that the no-manipulation time period of the trigger lever 20 reaches the predetermined time period Ta) is satisfied.

According to the configuration above, when the pruners 4 are left unattended in the active mode (or the power-on state), the pruners 4 are automatically switched from the active mode (or the power-on state) to the standby mode (or the power-off state) by the second state switching process executed by the control unit 96. However, while the pruners 4 are held by the holster 6, the second state switching process is less likely to be executed, as compared to while the pruners 4 are not held by the holster 6. Thus, while the pruners 4 are held by the holster 6, the pruners 4 are suppressed from automatically switching from the active mode (or the power-on state) to the standby mode (or the power-off state). This can reduce bothersome the user would feel and thus improves the usability of the pruners 4.

Variants

In the first and second embodiments, the working machine systems 2, 202 may comprise a working machine of another type instead of the pruners 4. For example, the working machine systems 2, 202 may comprise a cutter, a rivetter, or a grinder instead of the pruners 4. In this case, the case portion 34 of the holster 6 may be configured to house a blade portion of the cutter, a rivet holding portion of the rivetter, or a blade portion of the grinder.

The holster 6 may comprise an attachment portion configured to be detachably attached to the user's body instead of or in addition to the loop portion 32. For example, the holster 6 may comprise a band portion configured to be detachably attached to the arm or the leg of the user.

In the first and second embodiments, the pruners 4 may comprise a power supply cable connectable to an external power source such as a commercial power source, instead of the power interface 60. In this case, the pruners 4 may operate with power supplied from the external power source.

In the first and second embodiments, the electric motor 54 may be replaced by a motor of another type (e.g., a brush motor, a motor with a core)

(See FIG. 8.) In the first end second embodiments, the control device 52 may not comprise the power supply switch 108. In other words, the power supply switch 108 is replaced with a conductive wire.

(See FIG. 8.) In the first and second embodiments, the power supply switch 108 may be between the power interface 60 and the inverter gate circuit 104. In this case, the power supply switch 108 may selectively connect and disconnect the power interface 60 and the inverter gate circuit 104.

(See FIG. 8.) In the first and second embodiments, the power supply switch 108 may be provided between each of the six switches 122 and the inverter gate circuit 104. In this case, each power supply switch 108 may selectively connect and disconnect corresponding one of the six switches 122 and the inverter gate circuit 104.

(See FIGS. 3 and 4.) In the first and second embodiments, the holster detection sensor 48 may be interchanged with the magnet 50. Specifically, the holster detection sensor 48 may be located in the holster 6 and the magnet 50 may be located in the pruners 4. In this case, a communication means for transmitting an output signal from the holster detection sensor 48 to the control unit 96 in the pruners 4 may be provided between the pruners 4 and the holster 6. The communication means may comprise for example a transmitter located in the holster 6 and a receiver located in the pruners 4.

(See FIGS. 3 and 4.) In the first and second embodiments, the magnet 50 may not be located within the second protrusion 44 in the holster 6. For example, the magnet 50 may be located on the inner surface of the case portion 34 at a position where the first protrusion 42 and the second protrusion 44 are not located.

(See FIGS. 3 and 4.) In the first and second embodiments, the holster detection sensor 48 may be replaced by a detector of another type. Similarly, the magnet 50 may also be replaced by a detection target of another type. For example, the holster detection sensor 48 may be replaced by a photointerrupter comprising a light emitting element and a light receiving element. The magnet 50 may be replaced by a detection target that blocks light between the light emitting element and the light receiving element of the photointerrupter when the pruners 4 are held by the holster 6. In this case, the detection mechanism 46 may determine whether the pruners 4 are held by the holster 6 or not based on whether the light between the light emitting element and the light receiving element of the photointerrupter is blocked by the detection target. Alternatively, the holster detection sensor 48 may be replaced by a contact sensor (e.g., a microswitch). The magnet 50 may be replaced by a detection target that contacts the contact sensor when the pruners 4 are held by the holster 6. In this case, the detection mechanism 46 may detect whether the pruners 4 are held by the holster 6 or not based on whether the detection target is in contact with the contact sensor.

Figure 11:
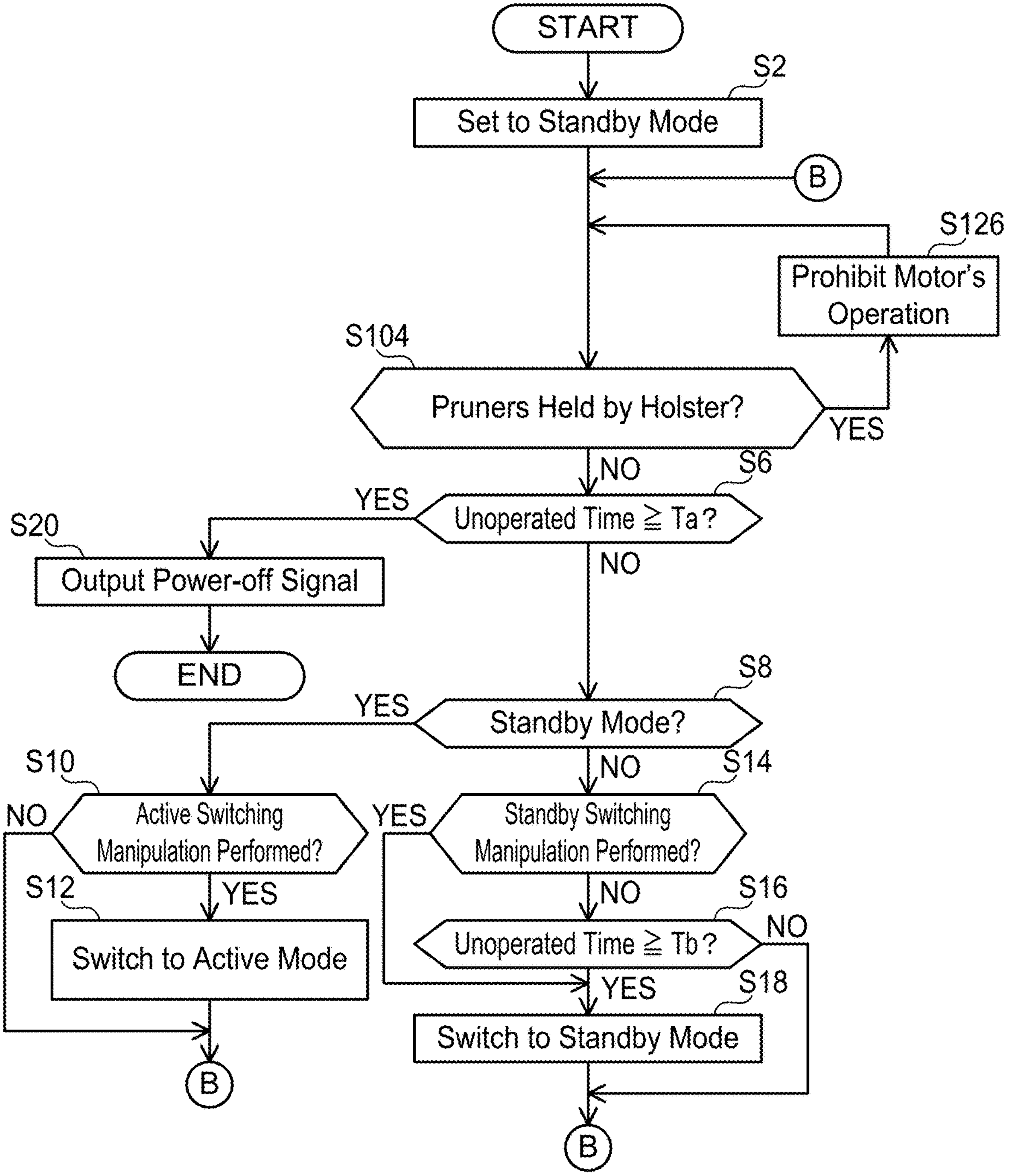
FIG. 11 shows a flowchart of a second mode switching process executed by a control unit 96 of pruners 4 of a working machine system 202 according to a second embodiment.

(See FIGS. 9 and 11.) In the first and second embodiments, the values of the predetermined time periods Ta, Tb may be changed depending on the environment in which the pruners 4 are used. In the first embodiment, the values of the predetermined time periods Tc, Td may be changed depending on the environment in which the pruners 4 are used as long as the relationship Ta<Tc, Tb<Td holds true. For example, the control unit 96 may change the values of the predetermined time periods Ta, Tb (and Tc, Td) depending on the temperature detected by the temperature detection sensor 114. Alternatively, the user may change the values of the predetermined time periods Ta, Tb (and Tc, Td) using a switch (not shown).

What is claimed is:

1. A working machine system, comprising:
a working machine including:
a working unit configured to perform a working operation;
an electric motor configured to drive the working unit;
a manipulation unit configured to be manipulated by a user;
a power connection unit configured to be connected to a power source; and
a control unit;
a working machine holder including:
a case portion configured to house at least the working unit; and
an attachment portion configured to be detachably attached to the user; and
a detection mechanism configured to detect whether the working machine is held by the working machine holder,
wherein
the working machine is configured to be switched between a first state in which the working operation is permitted and a second state in which the working operation is prohibited and a predetermined switching manipulation to the manipulation unit is required to switch to the first state,
the control unit is configured to execute a second state switching process in which the control unit switches the working machine from the first state to the second state in response to a predetermined condition being satisfied,
when the detection mechanism detects that the working machine is not held by the working machine holder, the predetermined condition includes that an unattended time period of the working machine is more than or equal to a first predetermined time period, and
when the detection mechanism detects that the working machine is held by the working machine holder, the predetermined condition includes that the unattended time period of the working machine is more than or equal to a second predetermined time period which is longer than the first predetermined time period.

2. The working machine system according to claim 1, wherein the manipulation unit includes a trigger manipulation member that functions as a trigger to cause the working unit to perform the working operation, the first state is an active state in which the control unit operates the electric motor to cause the working unit to perform the working operation when the trigger manipulation member is manipulated, the second state is a standby state in which the control unit does not cause the working unit to perform the working operation even when the trigger manipulation member is manipulated, the switching manipulation includes an active switching manipulation to the trigger manipulation member, and the second state switching process is a standby state switching process in which the control unit switches the working machine from the active state to the standby state.

3. The working machine system according to claim 2, wherein the working machine further includes a switching circuit configured to selectively connect and disconnect the power source and the electric motor, when the detection mechanism detects that the working machine is not held by the working machine holder, the switching circuit electrically connects the power source and the electric motor, when the detection mechanism detects that the working machine is held by the working machine holder, the switching circuit electrically disconnects the power source and the electric motor, the switching circuit is configured to operate independent from the control unit, the working unit includes a first blade and a second blade that is movable between an open position and a closed position relative to the first blade, the working operation is an operation in which the second blade is moved from the open position to the closed position, the working machine holder further includes a protrusion protruding from an inner surface of the case portion and configured to contact with the working machine, the detection mechanism includes a magnetic sensor and a magnet, one of the magnetic sensor and the magnet is disposed in the working machine, and the other of the magnetic sensor and the magnet is disposed in the protrusion of the working machine holder.

4. The working machine system according to claim 1, wherein the manipulation unit includes a power switch member, the first state is a power-on state in which power is supplied from the power source to the control unit, the second state is a power-off state in which power is not supplied from the power source to the control unit, the switching manipulation includes a manipulation to the power switch member, and the second state switching process is a power-off state switching process in which the control unit switches the working machine from the power-on state to the power-off state.

5. The working machine system according to claim 4, wherein the working machine further includes a switching circuit configured to selectively connect and disconnect the power source and the electric motor, when the detection mechanism detects that the working machine is not held by the working machine holder, the switching circuit electrically connects the power source and the electric motor, when the detection mechanism detects that the working machine is held by the working machine holder, the switching circuit electrically disconnects the power source and the electric motor, the switching circuit is configured to operate independent from the control unit, the working unit includes a first blade and a second blade that is movable between an open position and a closed position relative to the first blade, the working operation is an operation in which the second blade is moved from the open position to the closed position, the working machine holder further includes a protrusion protruding from an inner surface of the case portion and configured to contact with the working machine, the detection mechanism includes a magnetic sensor and a magnet, one of the magnetic sensor and the magnet is disposed in the working machine, and the other of the magnetic sensor and the magnet is disposed in the protrusion of the working machine holder.

6. The working machine system according to claim 1, wherein the working machine further includes a switching circuit configured to selectively connect and disconnect the power source and the electric motor, when the detection mechanism detects that the working machine is not held by the working machine holder, the switching circuit electrically connects the power source and the electric motor, and when the detection mechanism detects that the working machine is held by the working machine holder, the switching circuit electrically disconnects the power source and the electric motor.

7. The working machine system according to claim 6, wherein the switching circuit is configured to operate independent from the control unit.

8. The working machine system according to claim 1, wherein the working unit includes a first blade and a second blade that is movable between an open position and a closed position relative to the first blade, and the working operation is an operation in which the second blade is moved from the open position to the closed position.

9. The working machine system according to claim 1, wherein the detection mechanism includes:

a magnetic sensor disposed in one of the working machine and the working machine holder; and a magnet disposed in the other of the working machine and the working machine holder.

10. The working machine system according to claim 1, wherein the working machine holder further includes a protrusion protruding from an inner surface of the case portion and configured to contact with the working machine, the detection mechanism includes:

a detector; and a detection target configured to be detected by the detector, one of the detector and the detection target is disposed in the working machine, and the other of the detector and the detection target is disposed in the protrusion of the working machine holder.

11. A working machine, configured to be held by a working machine holder, wherein the working machine includes:

a working unit configured to perform a working operation;

an electric motor configured to drive the working unit;

a manipulation unit configured to be manipulated by a user;

a power connection unit configured to be connected to a power source;

a detector configured to detect whether the working machine is held by the working machine holder; and a control unit, the working machine is configured to be switched between a first state in which the working operation is permitted and a second state in which the working operation is prohibited and a predetermined switching manipulation to the manipulation unit is required to switch to the first state, the control unit is configured to execute a second state switching process in which the control unit switches the working machine from the first state to the second state in response to a predetermined condition being satisfied, when the detector detects that the working machine is not held by the working machine holder, the predetermined condition includes that an unattended time period of the working machine is more than or equal to a first predetermined time period, and when the detector detects that the working machine is held by the working machine holder, the predetermined condition includes that the unattended time period of the working machine is more than or equal to a second predetermined time period which is longer than the first predetermined time period.

* * * * *